(12) United States Patent
Churruca et al.

(10) Patent No.: US 8,771,494 B2
(45) Date of Patent: Jul. 8, 2014

(54) SYNTHESIS OF OIL CONTAINING MICROCAPSULES AND THEIR USE IN FUNCTIONAL COMPOSITE COATINGS

(75) Inventors: Maria Jose Churruca, Buenos Aires (AR); Pablo Adrian Castro, Buenos Aires (AR); Federico Jose Williams, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 941 days.

(21) Appl. No.: 12/645,382

(22) Filed: Dec. 22, 2009

(65) Prior Publication Data

US 2010/0155250 A1  Jun. 24, 2010

Related U.S. Application Data

(60) Provisional application No. 61/140,013, filed on Dec. 22, 2008.

(51) Int. Cl.
C25D 15/00 (2006.01)

(52) U.S. Cl.
USPC .......................................................... 205/109

(58) Field of Classification Search
CPC ........... C25D 7/00; C25D 15/00; C25D 15/02
USPC ........................................................ 205/109
See application file for complete search history.

(56) References Cited

U.S. PATENT DOCUMENTS

| | | | |
|---|---|---|---|
| 4,893,658 A * | 1/1990 | Kimura et al. | 138/109 |
| 6,506,509 B1 * | 1/2003 | Feldstein et al. | 428/702 |
| 8,021,721 B2 * | 9/2011 | Griffo | 427/430.1 |
| 2001/0052464 A1 * | 12/2001 | Akram et al. | 205/81 |
| 2004/0195826 A1 * | 10/2004 | Goto | 285/94 |
| 2005/0155866 A1 * | 7/2005 | Gabe et al. | 205/296 |
| 2005/0199506 A1 * | 9/2005 | Toben et al. | 205/253 |
| 2010/0096850 A1 * | 4/2010 | Schuh et al. | 285/333 |

FOREIGN PATENT DOCUMENTS

| | | |
|---|---|---|
| JP | 6 330392 A | 11/1994 |
| JP | 2008 248294 | 10/2008 |
| WO | WO 2008/054652 | 5/2008 |

OTHER PUBLICATIONS

Alexandridou, S. et al., "On the synthesis of oil-containing microcapsules and their electrolytic codeposition"; Surface and Coatings Technology, vol. 71 (1995), p. 267-276.

Alexandridou, S. et al., "Production of oil-containing polyterephthalamide microcapsules by interfacial polymerization. An experimental investigation of the effect of process variables on the microcapsules size distribution"; J. Microencapsulation, vol. 11 (1993), p. 603-614.

(Continued)

*Primary Examiner* — Nicholas A Smith
*Assistant Examiner* — Ciel Thomas
(74) *Attorney, Agent, or Firm* — Knobbe Martens Olson & Bear, LLP

(57) ABSTRACT

Systems and methods for the synthesis of lubricant-containing microcapsules are disclosed. Embodiments of composite nickel and copper coatings containing capsules with liquid lubricating oil cores are also disclosed. In certain embodiments, microcapsules can be incorporated into a metal plating solution to perform composite electrodeposition to obtain self lubricant metallic coatings. In some embodiments, much lower friction coefficient (~0.8) and far better wear resistance was obtained with the copper/microcapsules composite.

30 Claims, 24 Drawing Sheets

(56) References Cited

OTHER PUBLICATIONS

Alexandridou, S. et al., "Surface characterization of oil-containing polyterephthalamide microcapsules prepared by interfacial polymerization"; J. Microencapsulation, vol. 18 (2001), p. 767-781.

Cho, S. H. et al., "Polydimethylsiloxane-Based Self-Healing Materials"; Advance Material, vol. 18 (2006), p. 997-1000.

Dervos, C. T., et al.: "Nickel Matrix Composite Electrocoatings as Electrical Contacts", IEEE Transactions on Components and Packaging Technology, vol. 22, No. 3, Sep. 1999, pp. 460-466.

Dietz, A., et al.: "Mikrokapseln in Der Galvanotechnic/Electroplating. Micro-Encapsulating in Electroplating", Mo Metalloberflache, IGT Informationsgesellschaft Technik, Munchin, DE, vol. 54, No. 1, Jan. 1, 2000, pp. 28-30, XP009073180, ISSN: 0026-0797.

Ghosh, S. K.: "Functional coatings and Microencapsulation: A General Perspective" Functional Coatings by Polymer Microencapsulation, Wiley-VCH, Chapter 1, p. 1-28, 2006, ISBN-13 978-.

Kentepozidou, A. et al., "Nickel/microcapsules composite electrocoatings; the synthesis of water-containing microcapsules and preparation of the coatings"; Journal of Materials Science, vol. 31 (1996), p. 1175-1181.

Kumar, A. et al., "Self-healing coatings for steel"; Progress in Organic Coatings, vol. 55 (2006), p. 244-253.

PCT International Search Report and Written Opinion re PCT/IB2009/007952, mailed Sep. 29, 2010.

Stappers, L. et al., "The Effect of Turbulence on the Electrodeposition of Composite Coatings"; Journal of the Electrochemical Society, vol. 152 (2005), p. C392-C398.

White, S. R., et al., "Autonomic healing of polymer composites"; Nature, vol. 409 (2001), p. 794-797.

Yow, H. N. et al., "Formation of liquid core—polymer shell microcapsules"; Soft Matter, vol. 2 (2006), p. 940-949.

Zhu, L. et al., "Composite nickel coatings containing lubricating oil microcapsules and their tribological properties"; Plating & Surface Finishing, Technical Article (2005), p. 49-53.

Zhu, L., et al.: "Electrodeposition of composite copper / liquid-containing microcapsules coatings"; Journal of Materials Science, vol. 39 (2004), p. 495-499.

Zhu, L.: "Electrolytic Co-Deposition of Polymer-Encapsulated (Microencapsulated) Particles." Functional Coatings by Polymer Microencapsulation, Wiley-VCH, Chapter 9 p. 297-342, 2006.

* cited by examiner

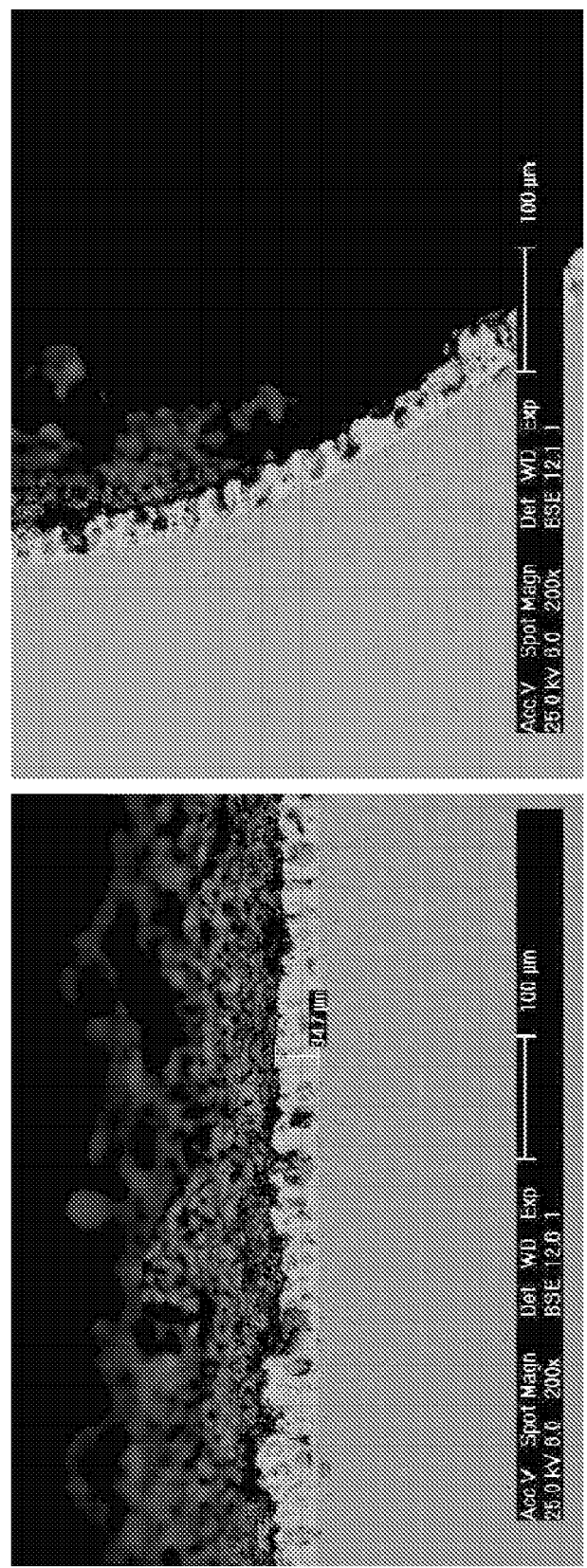

US 8,771,494 B2

SYNTHESIS OF OIL CONTAINING MICROCAPSULES AND THEIR USE IN FUNCTIONAL COMPOSITE COATINGS

CROSS-REFERENCE TO RELATED APPLICATIONS

This application claims the benefit of U.S. Provisional Application No. 61/140,013, filed Dec. 22, 2008, the entirety of which is hereby incorporated by reference.

BACKGROUND OF THE INVENTION

1. Field

Embodiments of the present disclosure relate to microcapsules with a liquid core, and in particular, composite nickel and copper coatings containing capsules with liquid lubricating oil cores. Further embodiments relate to methods of preparing composite nickel and copper coatings containing capsules with liquid lubricating oil cores. Additional embodiments relate to application of composite nickel and copper coatings containing capsules with liquid lubricating oil cores on steel threaded connections as a dope-free coating for lubrication and wear-resistance that can be environmentally friendly.

2. Description of the Related Art

The synthesis of composite coatings by incorporation of particles in electrodeposited metals has attracted scientific and technological interest since the late 1960s. This interest was fueled by the applications of composite coatings with improved material properties such as wear resistance, lubrication, or corrosion resistance.

The composite coatings which have so far found wide industrial applications have generally contained solid particles such as SiC and $Al_2O_3$. However, several publications on the incorporation of liquid-containing microcapsules into metal matrices have also appeared recently in the literature. Liquid microcapsules synthesis provides a new opportunity for the application of composite coatings in the protective treatment of metal surfaces. The combination of microencapsulation with traditional coating technology offers a completely new approach to surface functionalization.

These coatings can exhibit good tribological and/or anti-corrosive properties depending on the liquid core used such as lubricating oil, corrosion inhibitors, healants and resin. The electrolytic co-deposition of metals with microcapsules provides excellent wear resistance, corrosion resistance, and self-repairing characteristics, these being due to the release of the core materials from the liquid microcapsules.

SUMMARY

In certain embodiments, a method of manufacturing a composite coating includes providing a mixture including microcapsules and electrolyte. The microcapsules can include lubricant encapsulated within a shell. In some embodiments, the concentration of microcapsules in the mixture is greater than zero and less than about 13 milliliters per liter. The method can further include electroplating a composite coating onto a cathode surface using the mixture and a metal anode. The composite coating includes metal and at least some of the microcapsules. In certain embodiments, a composite coating is manufactured by a method herein.

In certain embodiments, the concentration of microcapsules in the mixture is greater than zero and less than about 6.5 milliliters per liter. In further embodiments, the concentration of microcapsules in the mixture is greater than zero and less than about 3 milliliters per liter. In even further embodiments, the concentration of microcapsules in the mixture is greater than zero and less than about 1.5 milliliters per liter. In some embodiments, a current density of about 15 to 65 $mA/cm^2$ is used for the electroplating.

In certain embodiments, the cathode includes a threaded steel pipe. In some embodiments, the microcapsules are greater than about 1 μm in diameter. A method can include manufacturing microcapsules by a method that includes mixing a first solution having a lubricant and a first monomer that is soluble within the lubricant with a second solution containing water and polyvinyl alcohol to provide an emulsion with the first solution dispersed within the second solution, mixing an aqueous solution having a second monomer and inorganic basic into the emulsion, and reacting at least some of the first monomer and the second monomer together to provide a polymeric shell around the lubricant.

In certain embodiments, a threaded article can include a composite layer deposited on a threaded surface. The composite layer can include metal and microcapsules, wherein the microcapsules comprise a lubricant encapsulated within a shell. In further embodiments, for at least the portions of the threaded surface where the composite layer is deposited, the composite layer forms a substantially continuous coating over all of the surfaces of a plurality of threads with a thickness of between about 10 to 100 μm. In further embodiments, the threaded article includes a steel pipe.

BRIEF DESCRIPTION OF THE DRAWINGS

FIGS. 16A and 16B are SEM photomicrographs of a cross-section of a composite coating on the steel threaded connection;

DETAILED DESCRIPTION OF THE PREFERRED EMBODIMENTS

Although co-deposition of oil containing microcapsules with metals on steel as self lubricating coatings has been applied on flat or simple shaped surfaces, deposition on threaded connections presents several challenges. Thread shapes can have angles and deep recesses that can prevent a homogeneous deposition and/or uniform layer thickness of the metal being electroplated. Additionally, internal threaded surfaces, such as the ones found in couplings, present a major plating challenge due to the difficulties associated to the particular geometry. Conventional plating methods tend to deposit microcapsules on angles and crests and less on flanks and roots of the thread.

Embodiments include methods for the preparation of composite nickel and copper coatings containing capsules with liquid lubricating oil cores. Metals such as copper, zinc or tin or alloys such as bronze can be applied by electrodeposition to threaded connections as anti-galling coatings. Reducing friction of these coatings can result in a better make-and-break performance of the connections. As self-lubricating coatings, metal/microcapsule composites plated on the thread of a coupling can reduce friction and when used together with grease, they can also provide "pockets" for lubricant retention as well. Additionally, in certain embodiments, the metal/microcapsules composite can be used in elevated temperature conditions whereas conventional coatings may fail.

Some objectives of the present work are: reduce friction of metallic or polymer coatings by incorporation of lubricant-containing microcapsules, synthesis and characterization of lubricant-containing microcapsules, and co-deposition of microcapsules with nickel or copper on steel. Advantageously, co-deposition of microcapsules with nickel or copper can be applied on steel threaded connections as a dope-free coating for lubrication and wear-resistance that can be environmental friendly. Further details on coatings for threaded connections, threaded connections themselves and threaded steel pipes are found in U.S. Publication No. 2008-0129044 A1, U.S. Pat. No. 6,921,110, U.S. Pat. No. 6,971,681, and International Patent Publication No. WO/2007/063079, the entirety of each of which is hereby incorporated by reference.

In certain embodiments, microcapsules/metal composite coatings can be obtained from a two step process. The liquid to be encapsulated is first emulsified and stabilized in another immiscible liquid followed by formation of the wall of the microcapsules. The emulsion/dispersion is then added to and suspended in the electrolytic bath, and co-deposited with the metal ions onto the cathode to form the composite coating.

Figure 1:
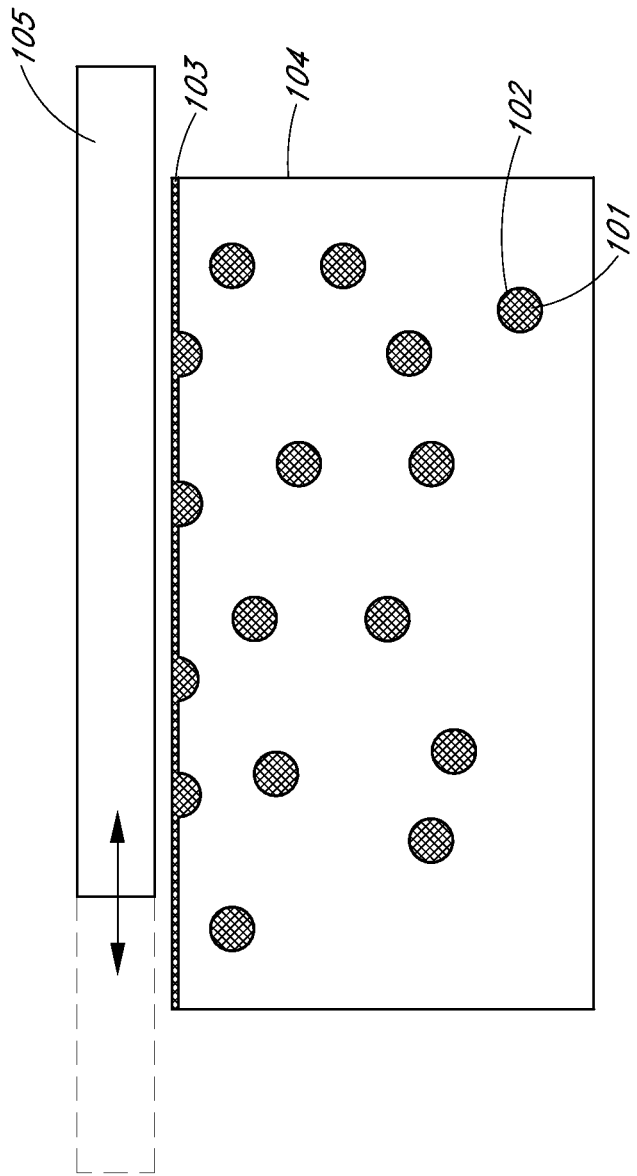
FIG. 1 illustrates one embodiment of release of active substances from micro-capsules due to wear of the surface of a microcapsule-containing composite coating.

In some embodiments, microencapsulation is a process in which liquid or solid is encapsulated by film-forming materials to produce particles of micrometer size. In certain embodiments, the microcapsules are greater than about 1 µm in diameter, or are greater than 1 µm in diameter. In some embodiments, the microcapsules have a diameter less than the thickness of the composite coating. The mean diameter of microcapsules in some embodiments is between about 5 to 15 µm, or is between 5 to 15 µm. In one embodiment, the mean diameter of the microcapsules is about 13 µm. The process is characterized by the properties of the core material of the microcapsules; these properties are well maintained by the core material being separated from the environment by a wall material. Subsequently, and under certain conditions, the core material 101 is released when the wall material 102 is broken, as illustrated in FIG. 1. As illustrated in FIG. 1, when the core material 101 is released, it can form a layer 103 of the core material 101 between the metal/microcapsule coating 104 and a surface 105 in contact with the metal/microcapsule coating 104. In certain embodiments, the thickness of the wall material is less than about 1 µm, or is less than 1 µm. In further embodiments, the thickness of the wall material is between about 100 nm and 1 µm, or is between 100 nm and 1 µm.

There are several production methods to synthesize microcapsules, each one with specific characteristics for different application. Depending on the chosen method, the wall material can be made from, for example: polystyrene, polyvinyl alcohol (PVA), gelatin and gum arabic, polyamide, urea formaldehyde, etc.

Figure 2:
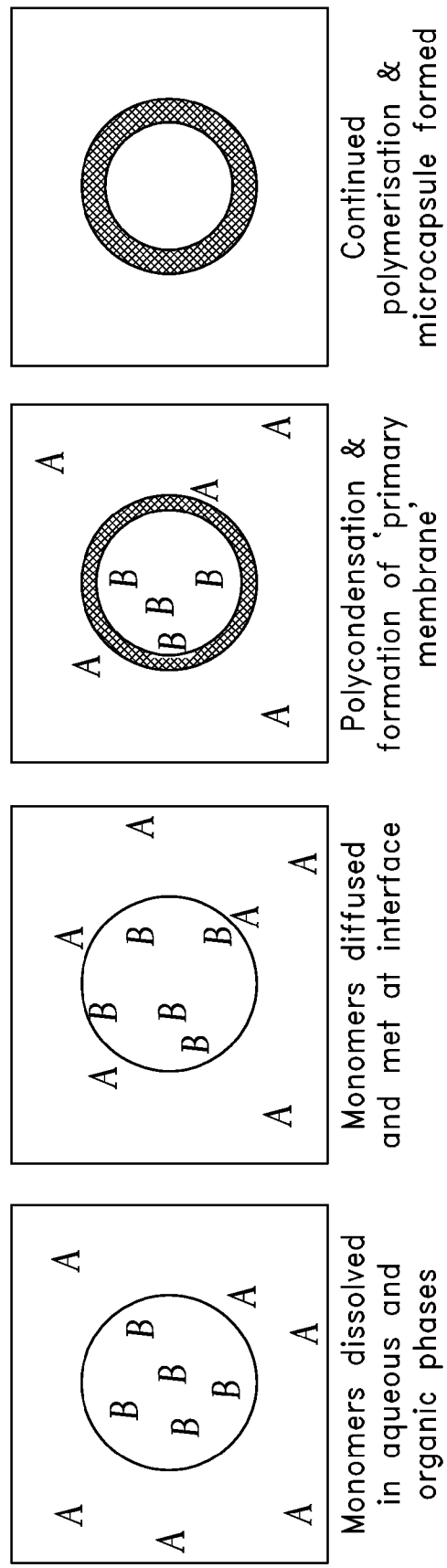
FIG. 2 illustrates one embodiment of polycondensation formation of shells around emulsion droplets.

In one embodiment, a method to prepare microcapsules suitable for electrolytic codeposition is interfacial polymerization. This method is an in situ polymerization technique suitable for the encapsulation of water-immiscible substances by a polymeric shell. As illustrated in FIG. 2, the technique involves two monomers (A and B) that are dissolved in incompatible phases meeting at the interface and reacting to produce a 'primary membrane' almost instantaneously. The reaction rate is then decreased as diffusion of monomers becomes restricted by the polymeric shell. After sufficient time, wall formation can be complete.

Figure 3:
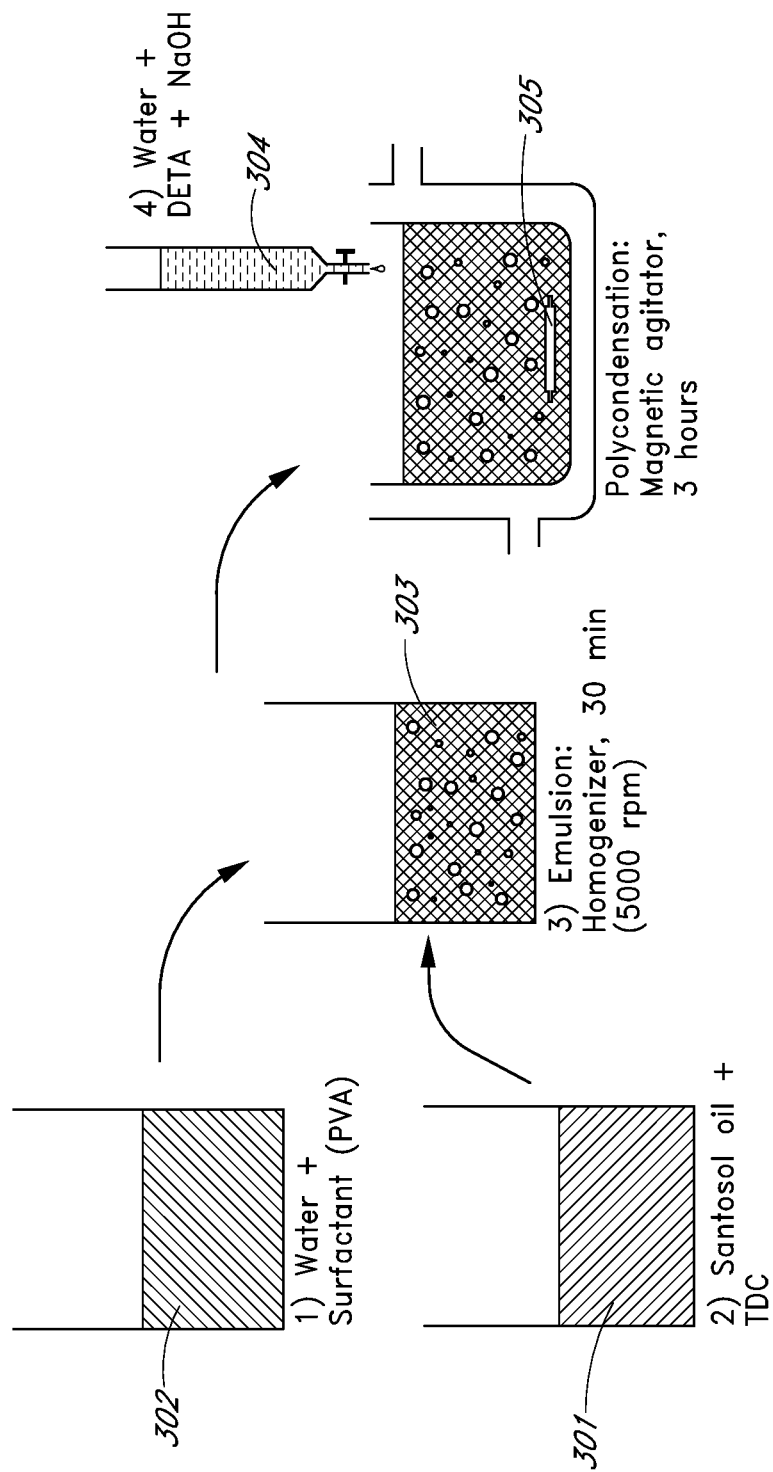
FIG. 3 illustrates a homogenizer employed for the oil-in-water emulsion.
Figure 4:
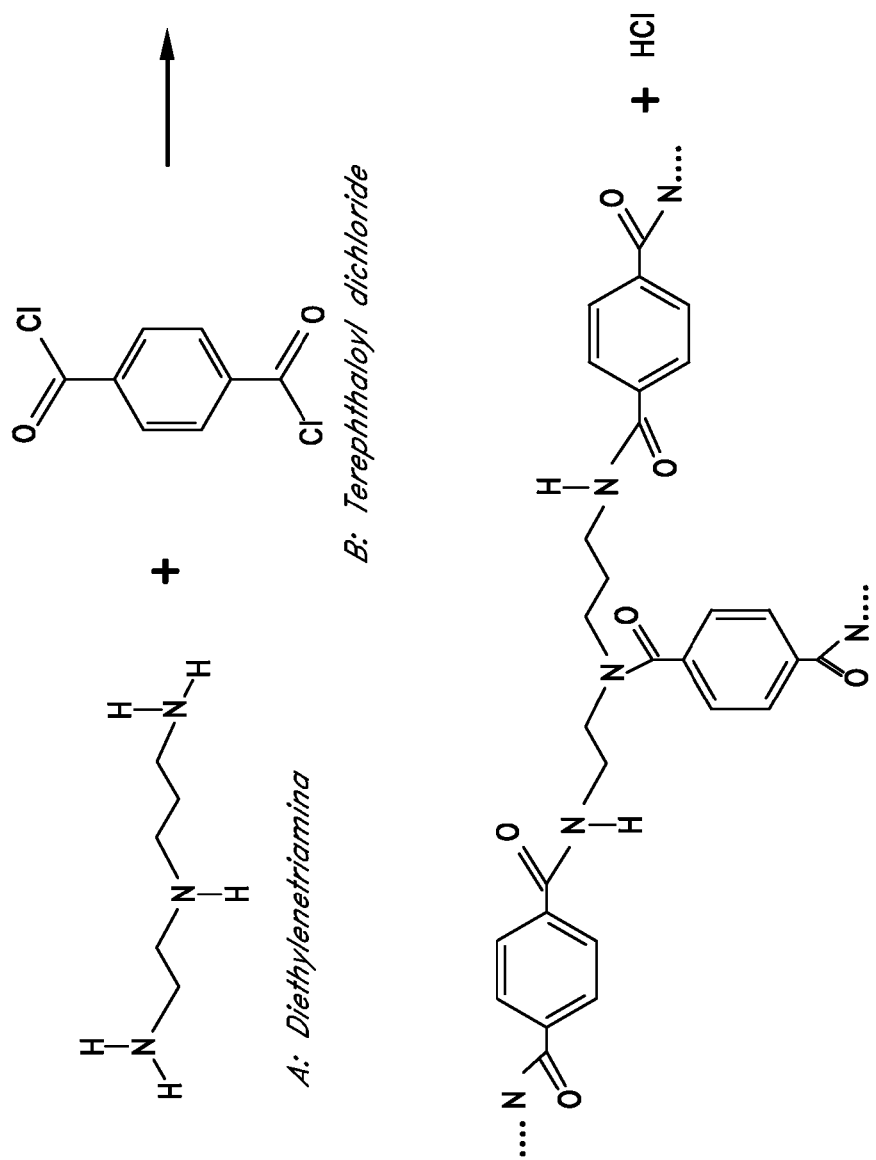
FIG. 4 illustrates one embodiment of a polymerization reaction for polyterephthalamide.

In some embodiments, oil containing polyamide microcapsules can be prepared by interfacial polymerization. The core material can be chosen from a wide range of lubricant oils such as: hydrogenated polyolefins, synthetic oils, semi-synthetic oil, mineral oils, esters, silicone, fluorocarbons, etc. FIG. 3 illustrates one embodiment of synthesis of microcapsules. In certain embodiments, the microcapsules are manufactured by a method that includes mixing a first solution 301 having a lubricant and a first monomer that is soluble within the lubricant with a second solution 302 to provide an emulsion 303 with the first solution 301 dispersed within the second solution 302. Preferably, the first solution 301 and second solution 302 are immiscible. In some embodiments, the second solution contains water and polyvinyl alcohol. The method can further include mixing a third solution 304 having a second monomer into the emulsion 303, and reacting at least some of the first monomer and the second monomer together to provide a polymeric shell around the lubricant. Mixing can be performed, for example, with a magnetic agitator 305. In some embodiments, the third solution 304 is an aqueous solution. In further embodiments, the third solution 304 also includes an inorganic basic. In one embodiment, the first monomer comprises terephthaloyl dichloride (TDC) and the second monomer comprises diethylenetriamine (DETA). As illustrated in FIG. 4, DETA and TDC can react to form polyterephthalamide as the wall material.

In certain embodiments, microcapsules can be incorporated into a metal plating solution to perform composite electrodeposition to obtain self lubricating metallic coatings. The electrodeposited metal can be: copper, nickel, tin, zinc, copper-tin alloys, nickel alloys, etc.

In some embodiments, the method of manufacturing a composite coating includes providing a mixture having microcapsules and electrolyte, wherein the microcapsules comprise a lubricant encapsulated within a shell. The method further includes electroplating a composite coating onto a cathode surface using the mixture and a metal anode cathode, wherein the composite coating includes a metal and the microcapsules.

The mixture of microcapsules and electrolyte can affect the resulting composite coating. In certain embodiments, the concentration of microcapsules in the mixture is greater than zero and less than about 1.5 ml·l$^{-1}$ (milliliters per liter). Further embodiments include concentrations of microcapsules in the mixture of greater than zero and less than about 3 ml·l$^{-1}$, 6.5 ml·l$^{-1}$, or 13 ml·l$^{-1}$. Some embodiments include concentrations of microcapsules in the mixture of greater than zero and less than 3 ml·l$^{-1}$, 6.5 ml·l$^{-1}$, or 13 ml·l$^{-1}$. Unexpectedly, the number of microcapsules incorporated into the metal coating increases as the concentration of microcapsules in the mixture decreased from 13 ml·l$^{-1}$ to 1.5 ml·l$^{-1}$.

The electrolyte used can be selected based on the type of metal to be co-deposited with the microcapsules. For example, to deposit copper, the electrolyte can include a chemical to provide the metal ions such as $CuSO_4^+$. The electrolyte can also include an acid such as $H_2SO_4$ to provide an acidic solution. Furthermore, the electrolyte can include a surfactant to stabilize the microcapsules in the electrolyte solution. For example, sodium lauryl sulphate (SLS) can be used as the surfactant. The mixture of electrolyte and microcapsules can be agitated to maintain substantially uniform concentration of microcapsules across the mixture. For example, the anode can be rotated to agitate the mixture.

The anode is selected based on the type of metal to be co-deposited with the microcapsules. For example, to deposit copper, a copper anode could be used. The cathode can be any material that the metal/microcapsules are to be deposited on. In certain embodiments, the cathode is steel. In further embodiments, the cathode has a threaded surface. To increase adhesion between the cathode surface and the composite coating, a strike coating can be deposited onto the cathode prior to depositing the composite coating. In certain embodiments, the current density during electroplating is about 15 to 65 mA/cm$^2$. In further embodiments, the current density is about 15 mA/cm$^2$.

Co-depositing metal and microcapsules can produce a threaded article that includes a composite layer of metal and microcapsules with lubricant encapsulated within a shell deposited on a threaded surface. For example, the metal can be copper or nickel. In certain embodiments, the composite layer is about 10 to 100 µm thick, or is 10 to 100 µm thick. In some embodiments, the composite layer is about 5 to 50 µm thick, or is 5 to 50 µm thick. In one embodiment, the composite layer thickness is about 30 µm. In further embodiments, the composite layer thickness is greater than the diameter of the microcapsules In some embodiments, the microcapsules are greater than about 1 µm in diameter. In certain embodiments, a strike coating is used between the threaded surface and the composite layer to increase adhesion. For example, the striking coating can be nickel. In certain embodiments, a method of use for a threaded article with a microcapsules/metal coating can be for connecting to threaded joints.

The threaded surfaces can have a variety of geometries. In certain embodiments, threaded connections can be of API (American Petroleum Institute) or Premium configurations. Examples of API threaded connections include Rounded, Buttress and Extreme Line, and examples of Premium connections include Wedge Series 500™ and Blue™ Series from TenarisHydril. In certain embodiments, the external diameter of the threaded connection is between about 2 and 25 inches and the threaded portions have between about 2 to 10 threads per inch, more preferably between about 4 and 8 threads per inch.

Figure 5A:
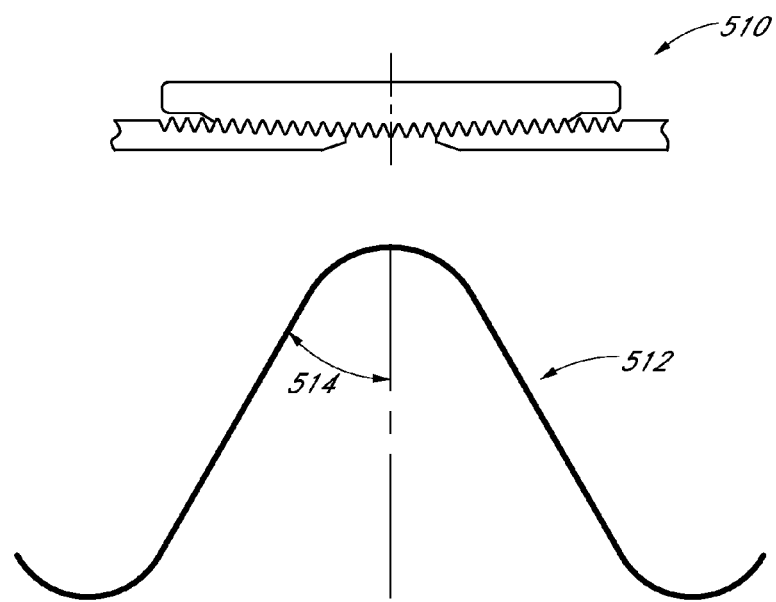
FIGS. 5A-C illustrate embodiments of threaded connectors for (A) API Rounded, (B) API Buttress, and (C) Premium.

FIG. 5A illustrates an API Rounded threaded connection 510 and a rounded thread 512 from the threaded connection 510. The thread angle can be about 60 degrees, or the half angle 514 of the thread can be about 30 degrees.

Figure 5B:
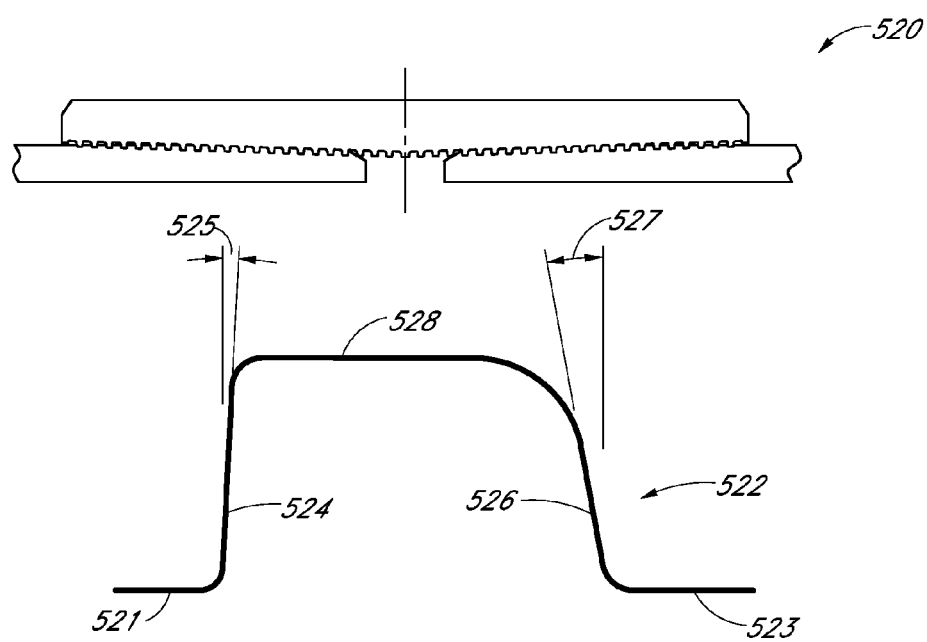

FIG. 5B illustrates an API Buttress threaded connection 520 and a buttress thread 522. The buttress thread 522 can include a loading flank 524, a stabbing flank 526 and a crest 528 extending between the loading flank 524 and the stabbing flank 526. The loading flank 524 extends between the crest 528 and a first root 521. The loading flank 524 forms an angle 525 from a plane that is perpendicular to the longitudinal axis of the threaded connection 520. In certain embodiments, the angle 525 is about 3 degrees. The stabbing flank 526 extends between the crest 528 and a second root 523. The stabbing flank 526 forms an angle 527 from a plane that is perpendicular to the longitudinal axis of the threaded connection 520. In certain embodiments, the angle 527 is about 10 degrees.

Figure 5C:
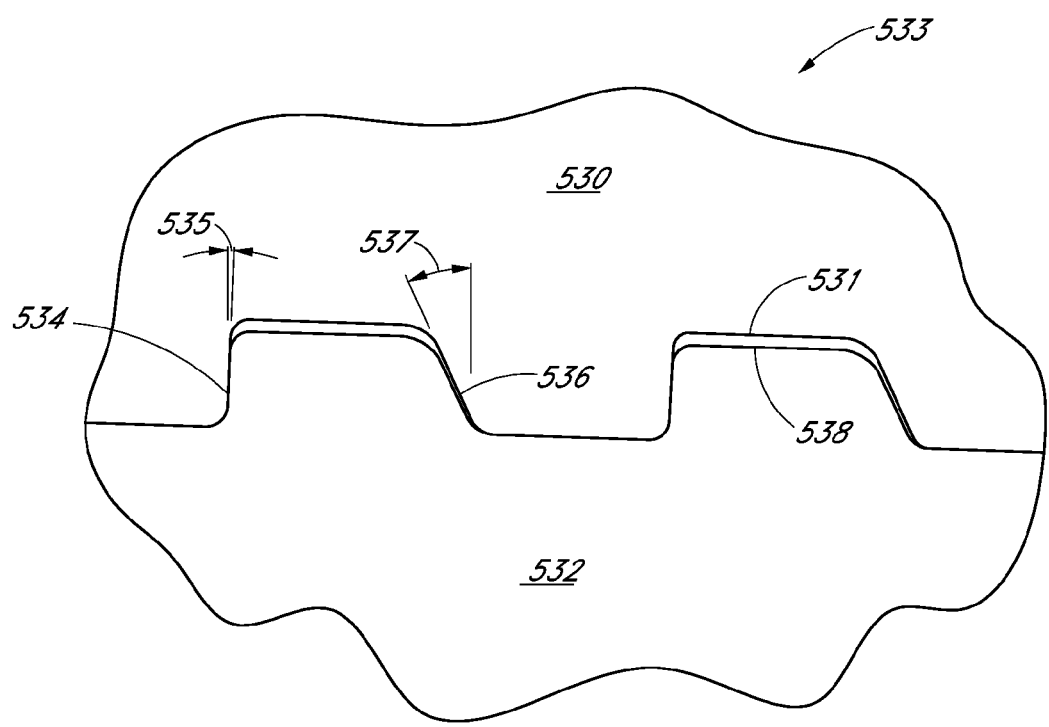

FIG. 5C illustrates a Premium threaded connection. The threaded connection can include a box 530 and a pin 532, each of which includes threads. The threads of the box 530 and the pin 532 can have similar features as the thread 522 illustrated in FIG. 5B. For example, the thread can include a loading flank 534, a stabbing flank 536 and a crest 538 extending between the loading flank 534 and the stabbing flank 536. In certain embodiments, the loading flank 534 forms an angle 535 of about 3 degrees from a plane that is perpendicular to the longitudinal axis of the threaded connection. In certain embodiments, the stabbing flank 536 forms an angle 537 of about 25 degrees from a plane that is perpendicular to the longitudinal axis of the threaded connection. In further embodiments, the angle 537 is between about 10 and 25 degrees. In certain embodiments, the crest 538 of the pin 532 forms a gap or clearance between a root 531 of the box 530. The gap can allow for dope allocation. In certain embodiments, the threaded surface has at least one concave surface with a radius of curvature less than about 0.55 mm and in further embodiments, less than about 0.20 mm. In certain embodiments, the threaded surface has at least one convex surface with a radius of curvature of less than about 0.60 mm and in further embodiments, less than about 0.25 mm. In some embodiments, the height difference between an adjacent crest 538 and root 531 is greater than about 1 mm and the distance between two adjacent crests 538 on a threaded surface is less than about 3 mm.

Figure 22:
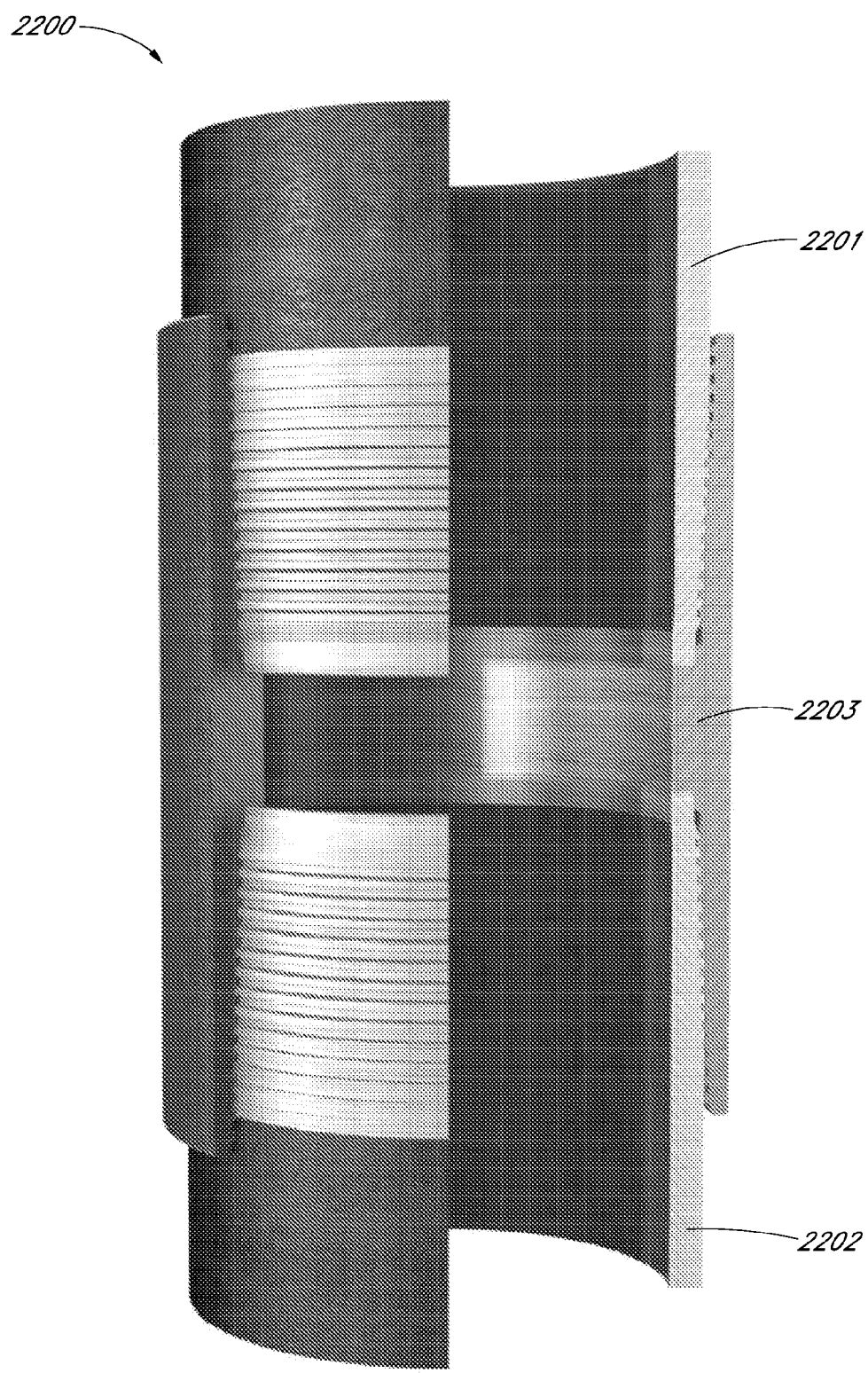
FIG. 22 illustrates an embodiment of a Premium threaded connection.

Microcapsule-metal composite coatings described herein are advantageously suitable to be deposited onto threaded sections of pipes suitable for applications such as oil or gas drilling, wells or pipelines. FIG. 22 illustrates an embodiment of a Premium threaded connection 2200 (TenarisHydril Blue™) designed for such applications. The threaded connection 2200 includes a box or coupling 2203 with two internally threaded portions, a first pin or pipe 2201 with an externally threaded end engaging one of the internally threaded portions, and a second pin or pipe 2202 with an externally threaded end engaging the other internally threaded portion. In certain embodiments, the connection inside diameter is between about 1.7 to 24.7 inches. A microcapsule-metal composite coating can be deposited onto at least one of the threaded portions. In certain embodiments, the microcapsule-metal composite coating is deposited onto the threaded portion of the box 2203 and/or one or both of the pins 2201, 2202. In certain embodiments, the microcapsule-metal coating can be deposited onto all of or a section of the threaded portion.

In further embodiments, for at least the sections or portions of the threaded surface that the composite layer is to be deposited onto (or where the composite layer is deposited), the composite layer forms a substantially continuous coating over all of the surfaces (e.g., crest/root, flanks) of a plurality of threads. The coating in one embodiment has a thickness of between about 10 to 100 μm over substantially the entire section of the threaded surface to be coated. In some embodiments, the coating may have a substantially uniform thickness, and for example, may have a variation in thickness of no more than about 50 μm, 40 μm, 30 μm, 20 μm or even no more than about 10 μm.

Further details regarding co-deposition of metal and microcapsules can be found in Liqun Zhu, Liu Feng and Yinghe He, "Composite nickel coatings containing lubricating oil microcapsules and their tribological properties," Plating & Surface Finishing, Technical Article (2005), p 49-53, S. Alexandridou, C. Kiparissides, J. Fransaer and J. P. Celis, "On the synthesis of oil-containing microcapsules and their electrolytic codeposition," Surface and Coatings Technology, Vol. 71 (1995), p. 267-276, Liqun Zhu, Liu Feng and Yinghe He, "Composite nickel coatings containing lubricating oil microcapsules and their tribological properties," Plating & Surface Finishing, Technical Article (2005), p 49-53, S. Alexandridou and C. Kiparissides, "Production of oil-containing polyterephthalamide microcapsules by interfacial polymerization. An experimental investigation of the effect of process variables on the microcapsules size distribution," J. Microencapsulation, Vol. 11 (1993), p. 603-614, S. Alexandridou, C. Kiparissides, F. Mange and A. Foissy, "Surface characterization of oil-containing polyterephthalamide microcapsules prepared by interfacial polymerization," J. Microencapsulation, Vol. 18 (2001), p. 767-781, the entirety of each of which is hereby incorporated by reference.

EXAMPLES

The following examples are provided to demonstrate the benefits of the embodiments of composite nickel and copper coatings containing capsules with liquid lubricating oil cores. These examples are discussed for illustrative purposes and should not be construed to limit the scope of the disclosed embodiments.

Microencapsulation Procedure

The following wall forming materials were employed in one embodiment: bifunctional acid chloride terephthaloyl dichloride (TDC) and trifunctional amine diethylenetriamine (DETA). Polyvinyl alcohol (PVA) was used as stabilizer and santosol oil was used as the lubricant liquid.

Figure 6:
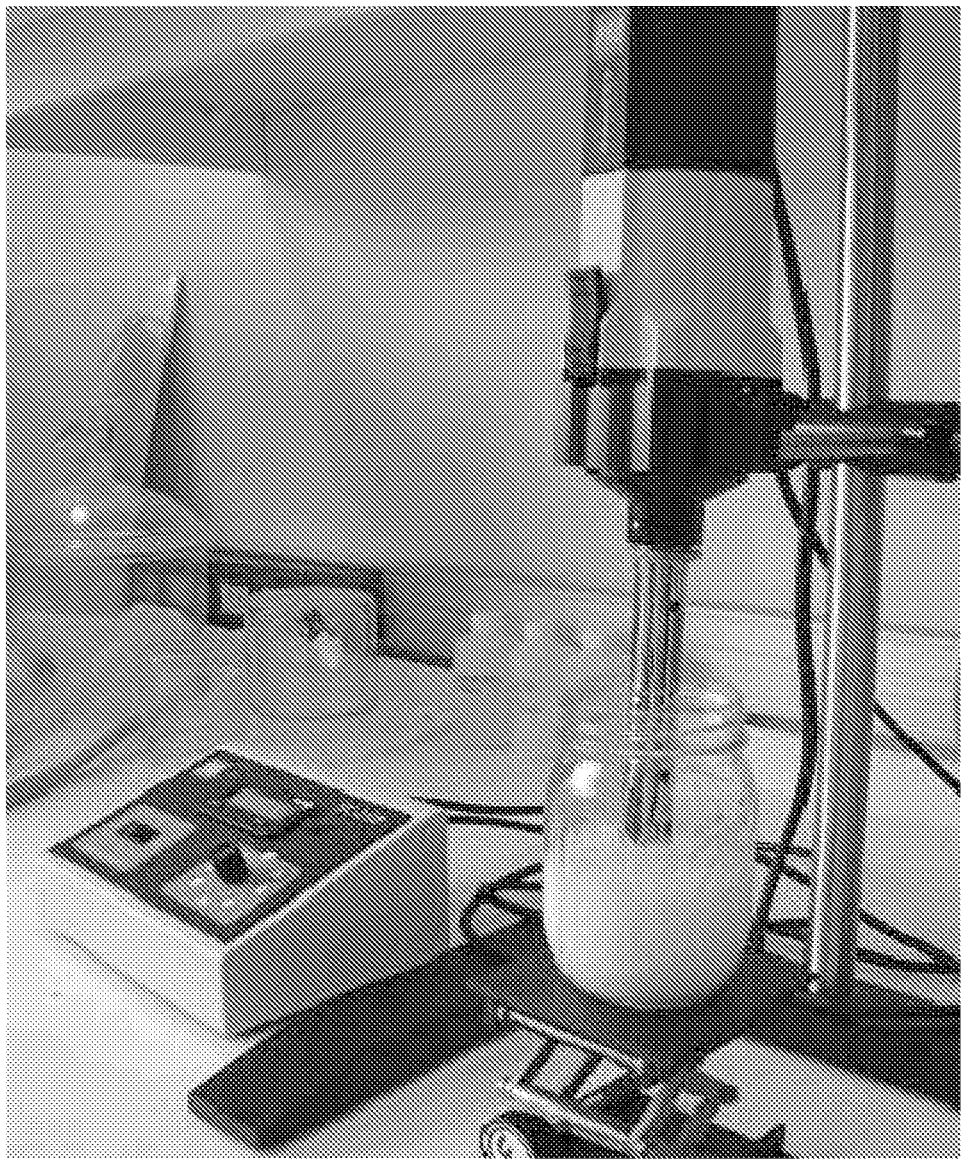
FIG. 6 is a photograph of a Pro Scientific 250 homogenizer for an embodiment of dispersion of an organic phase in the continuous aqueous phase of an interfacial polymerization reaction.

The experimental procedure employed for the preparation of embodiments of oil-containing polyterephthalamide microcapsules included the following steps: 200 ml of an aqueous solution containing 2 wt. % of PVA was added into a vessel. Then, 10 ml of santosol, containing 0.5 M of the oil-soluble shell-forming monomer, TDC, was added dropwise into the vessel. A Pro Scientific 250 homogenizer, photographed in FIG. 6, was employed for the dispersion of the organic phase in the continuous aqueous phase. The emulsion was allows to stir between 3000 and 7000 rpm for a total of 30 min, in order to reach steady-state conditions.

The oil-in-water emulsion was transferred to a jacketed reactor vessel. Then, 200 ml of an aqueous solution containing 0.75 M of the complementary monomer, DETA, and 1.0 M of the inorganic basic NaOH was added slowly into the reactor vessel. The polymerization was carried out at a constant temperature of 20° C. approximately for a total of 3 h, under condition of mild agitation, as illustrated in FIG. 3. After completion of the polymerization reaction the microcapsules were washed using a centrifugation-decantation procedure.

Figure 7:
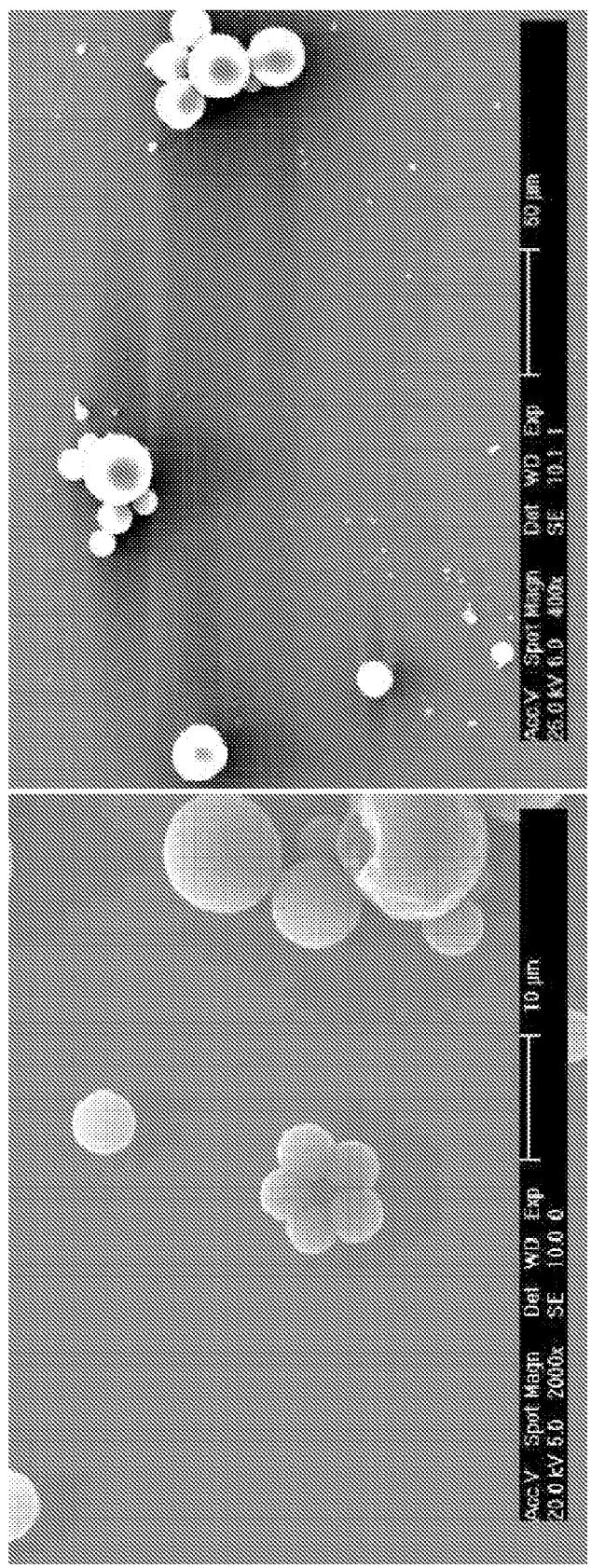
FIG. 7 illustrate SEM photomicrographs of oil-containing polyamide microcapsules from an emulsion that was stirred at 5000 rpm.
Figure 8:
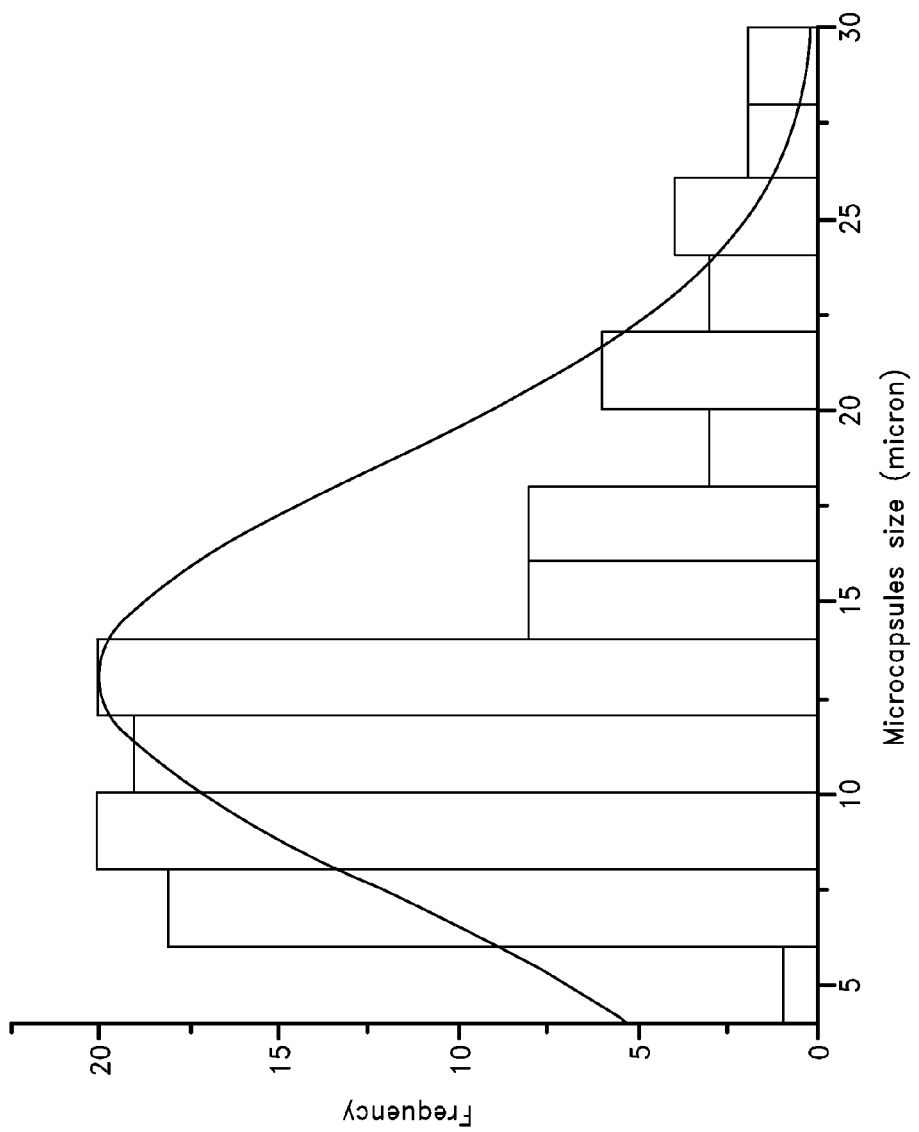
FIG. 8 illustrates one embodiment of size distribution of oil-containing polyamide microcapsules.

The size and surface morphology of the microcapsules were characterized by a Scanning Electron Microscope (SEM). For this purpose, the washed microcapsules were placed on a metallic plate and the samples were coated with gold before they were investigated in the SEM. As an example, the appearance of the microcapsules from an emulsion that was stirred at 5000 rpm is illustrated in FIG. 7 and the size distribution of microcapsules is depicted in FIG. 8. It can be seen that the mean diameter microcapsules obtained for this condition was 13 μm.

Co-Deposition Experiments with Nickel

In one embodiment, in order to co-deposit nickel and lubricant oil microcapsules, a volume of microcapsule suspension prepared by the above procedure was added to the electrolyte bath. The electrolyte was a regular Watts nickel solution contained 240 g·l$^{-1}$ NiSO$_4$.6H$_2$O+40 g·l$^{-1}$ NiCl$_2$.6H$_2$O+30 g·l$^{-1}$ H$_3$BO$_3$ and 0.05 wt. % of sodium lauryl sulphate (SLS) was used as a dispersing agent. Electroplating was carried out done at 55° C. with pH between 3.5 and 4.0 for 2 hours.

Figures 9A, 9B:
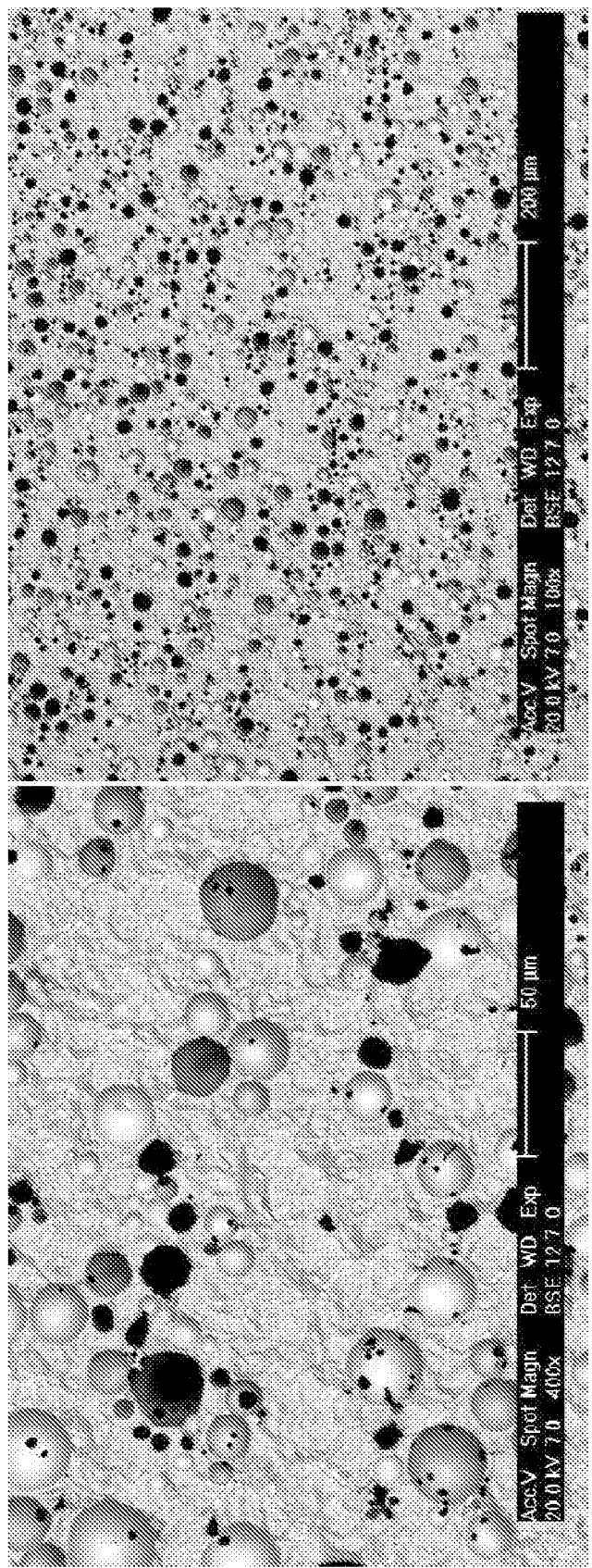
FIGS. 9A and 9B are SEM photomicrographs of a Ni-composite coating with microcapsules.

Embodiments of composite nickel coatings containing lubricating oil microcapsules were done altering different electroplating geometries. In one embodiment, the base cathodes used for the electrodeposition of nickel and microcapsules were carbon steel plate in a vertical geometry. The areas of the plates were 3.5 cm$^2$ approximately. The microcapsules were suspended in the bath during electrodeposition by a constant mechanical stirring and the current density was 50 mA/cm$^2$. To ensure adhesion between the Ni-microcapsules composite coating and substrate, the carbon steel plates were first electroplated in a Watts type nickel bath for 3 minutes. FIGS. 9A and 9B are SEM photomicrographs of the surface of composite coating incorporating microcapsules on the steel plate.

Figures 10A, 10B:
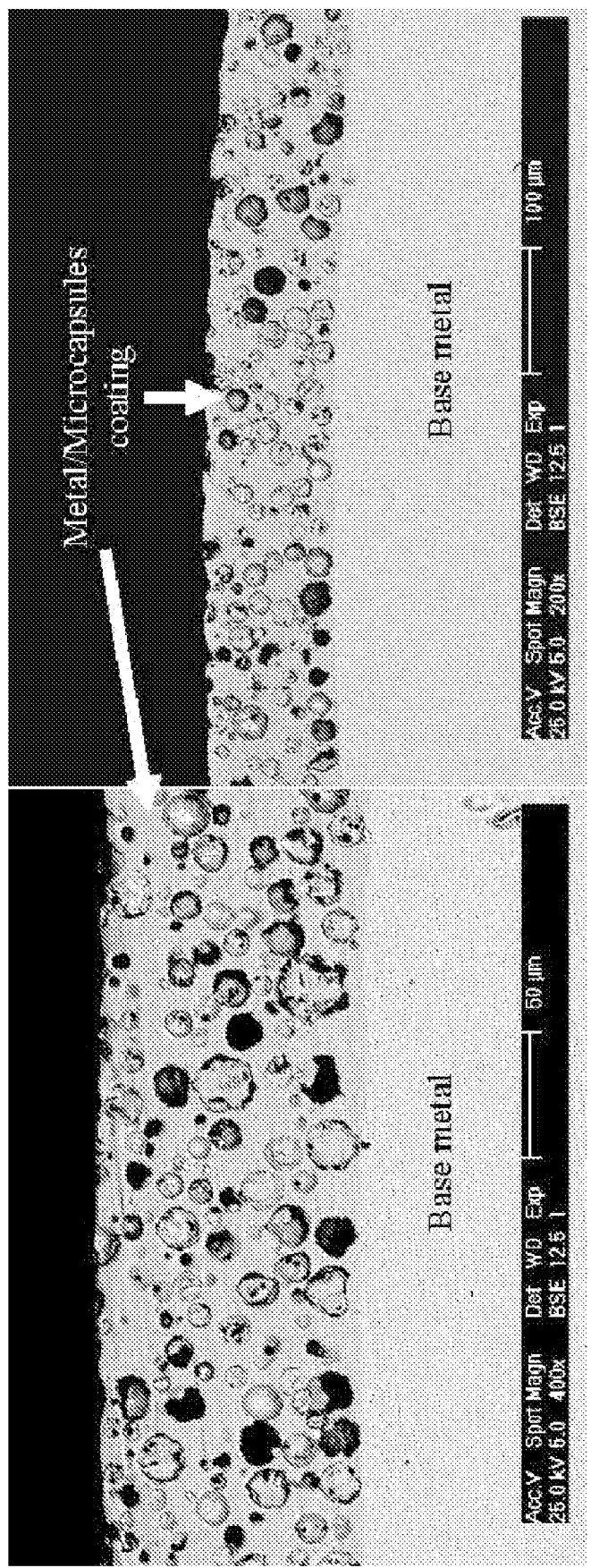
FIGS. 10A and 10B are SEM photomicrographs of a cross-section of the Ni-microcapsules composite.

In another embodiment, the electrodeposition experiments were run out on copper rotating cylinders. The diameters of the cylinder were 0.95 cm. The rotation velocity was 200 rpm using rotating electrode and the current density was 30 mA/cm$^2$. FIGS. 10A and 10B are SEM photomicrographs of the cross-section of the composite nickel containing microcapsules on copper cylinders. It can be seen that the microcapsules were enveloped in the composite nickel coatings.

Figure 11:
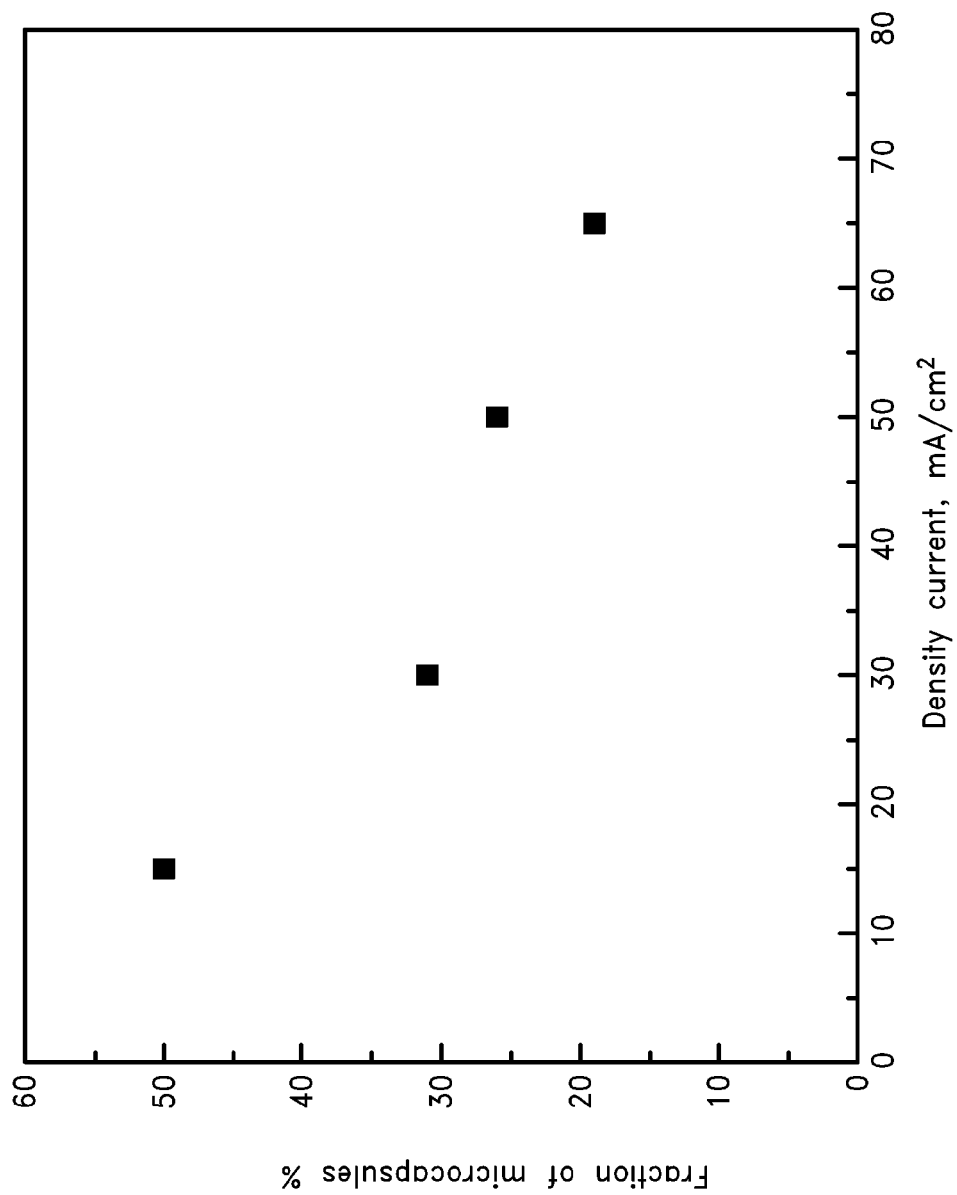
FIG. 11 illustrates one embodiment of the fraction of microcapsules of a deposited coating as a function of current density for current densities of 15, 30, 50 and 65 $mA/cm^2$.
Figure 12B:
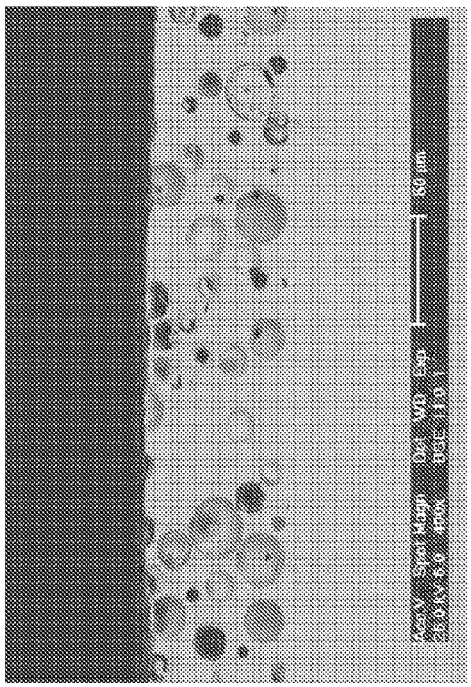
FIGS. 12A-E are SEM photomicrographs of cross-sections of (A) nickel without microcapsules, and microcapsule-Ni composite coatings from deposition using current densities of (B) 65 $mA/cm^2$, (C) 50 $mA/cm^2$, (D) 30 $mA/cm^2$ and (E) 15 $mA/cm^2$.
Figure 12D:
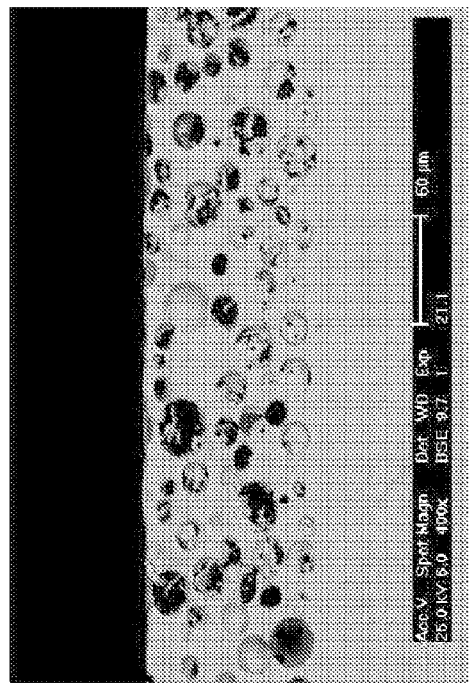
Figure 12A:
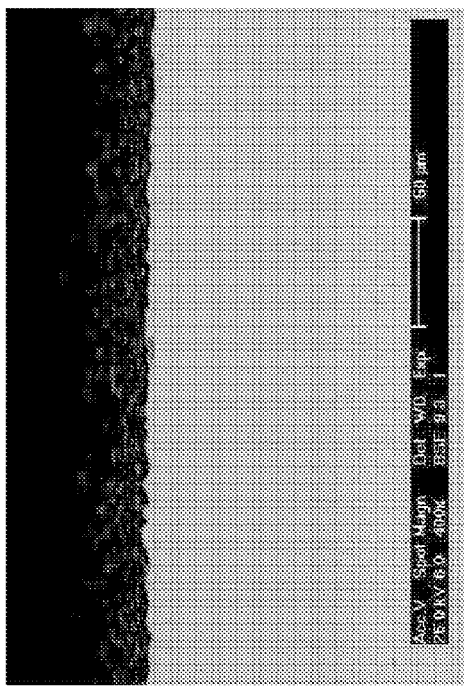
Figure 12C:
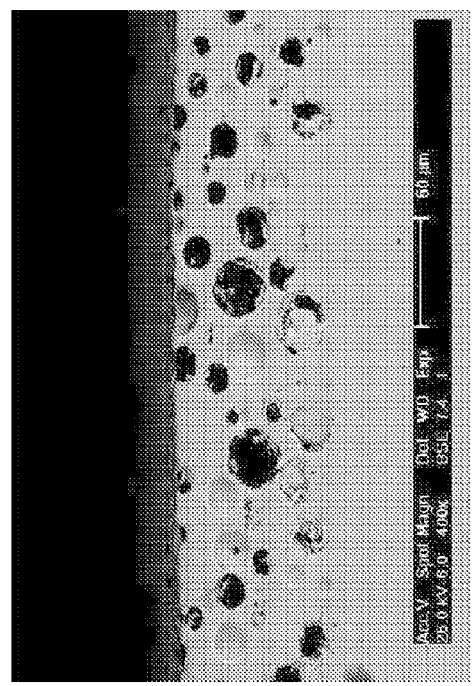
Figure 12E:
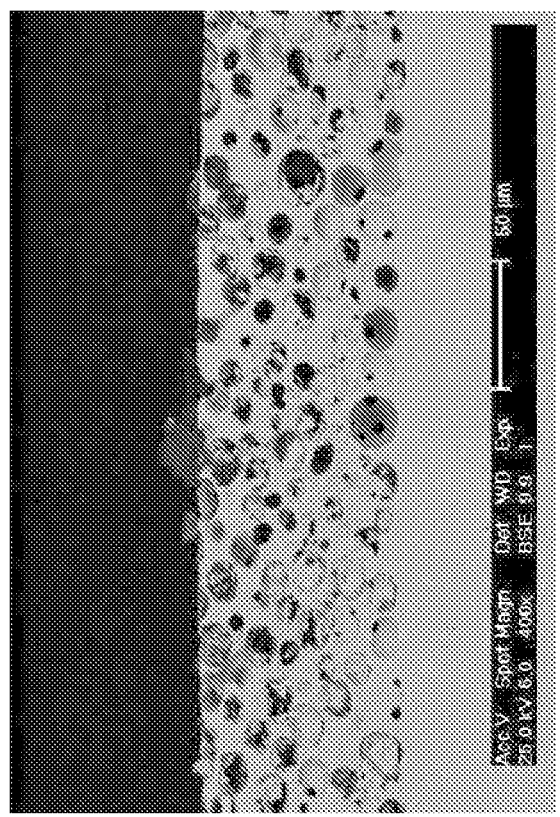

Different current densities (i) were also tested. FIG. 11 plots the volumetric fraction of microcapsules of deposited coating as a function of current density for current densities of 15, 30, 50 and 65 mA/cm$^2$. As current density decreased, the volume fraction of microcapsules of the deposited coating increased, and the number of microcapsules incorporated in the composite coating increased. In particular, a current density of about 15 mA/cm² was found to provide a uniform distribution of the coating thickness and microcapsules concentration. FIG. 12A is a SEM photomicrograph of nickel without microcapsules. FIGS. 12B-E are SEM photomicrographs of the microcapsules-Ni composites deposited at current densities of 65 mA/cm², 50 mA/cm², 30 mA/cm² and 15 mA/cm², respectively.

Co-Deposition Experiments with Copper

In one embodiment, in order to co-deposit copper and lubricant oil microcapsules, microcapsules were suspended in an electrolyte bath. The electrolyte was an acid cooper solution having 200 g·l⁻¹ $CuSO_4$+60 g·l⁻¹ $H_2SO_4$ and 0.4 g·l⁻¹ of sodium lauryl sulphate (SLS) that was used as a surfactant stabilizing the microcapsules in the acidic copper solution. Different microcapsule concentrations in the bath were tested. The microcapsule concentrations varied between 1.5 and 13 ml·l⁻¹.

Figure 13:
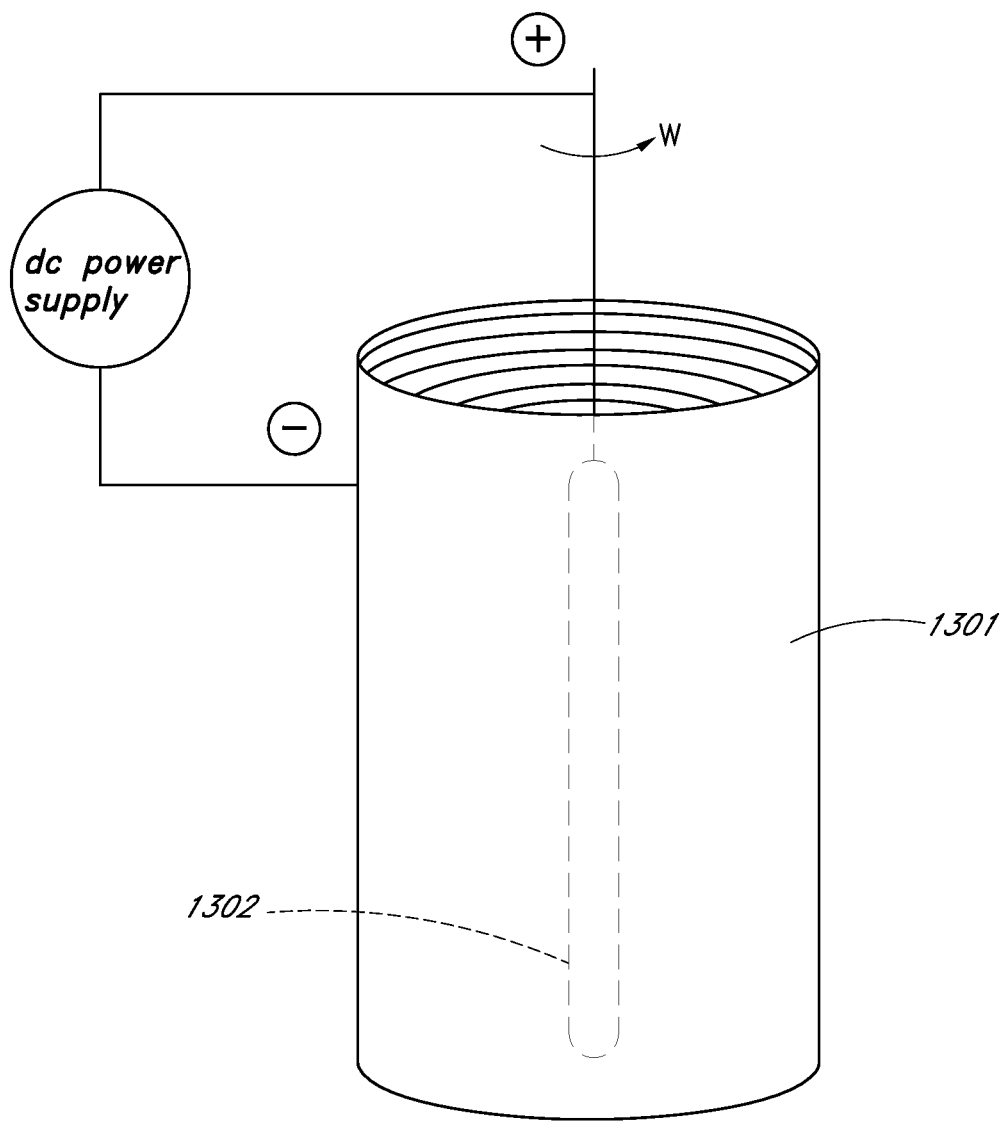
FIG. 13 illustrates an embodiment of an electroplating configuration with an internally threaded cathode.
Figure 14:
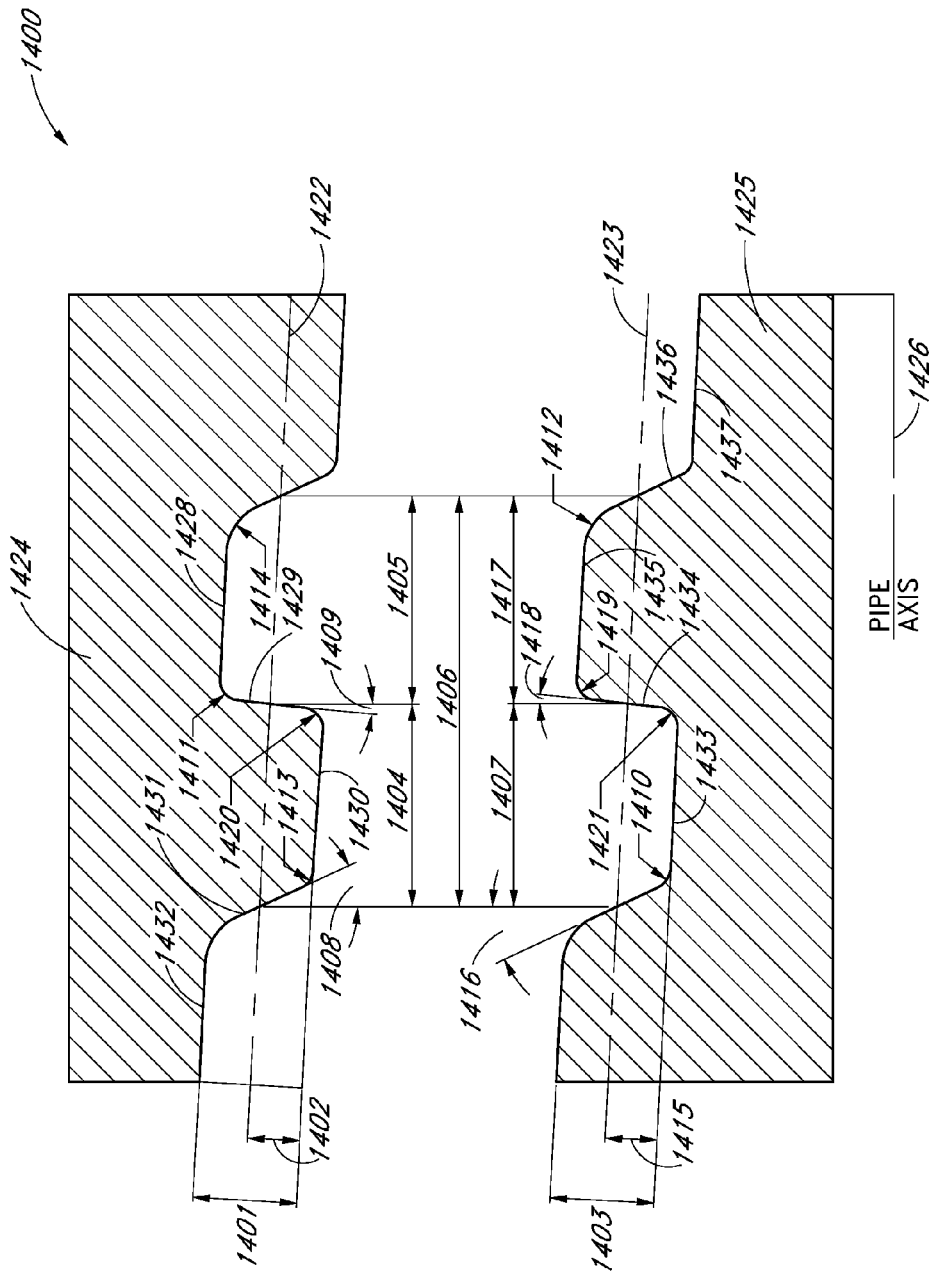
FIG. 14 illustrates an embodiment of a threaded connector.
Figure 15A:
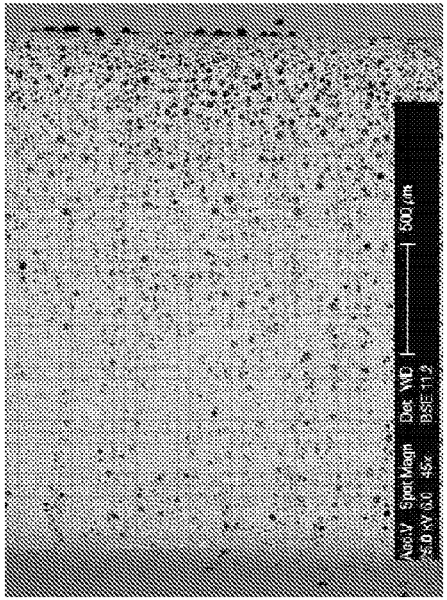
FIGS. 15A-D are SEM photomicrographs of the microcapsule concentration incorporated in composite coatings for microcapsule concentration in the bath of (A) 1.5 ml·l⁻¹, (B) 3 ml·l⁻¹, (C) 6.5 ml·l⁻¹, and (D) 13 ml·l⁻¹.
Figure 15B:
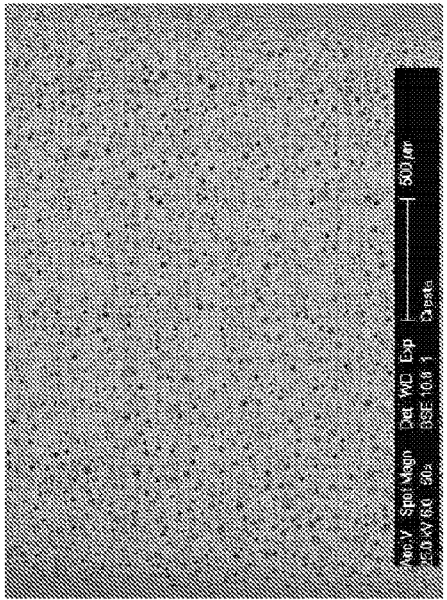
Figure 15C:
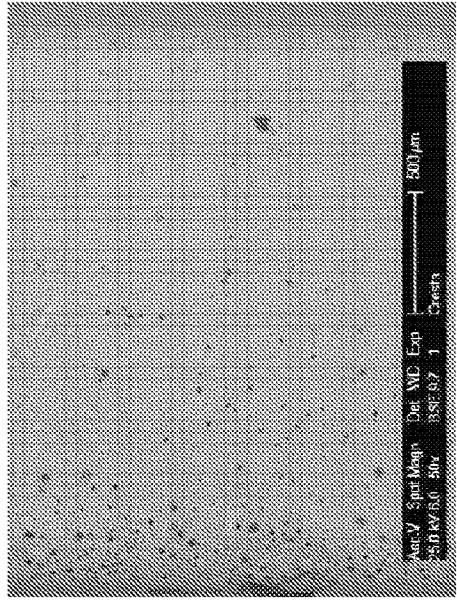
Figure 15D:
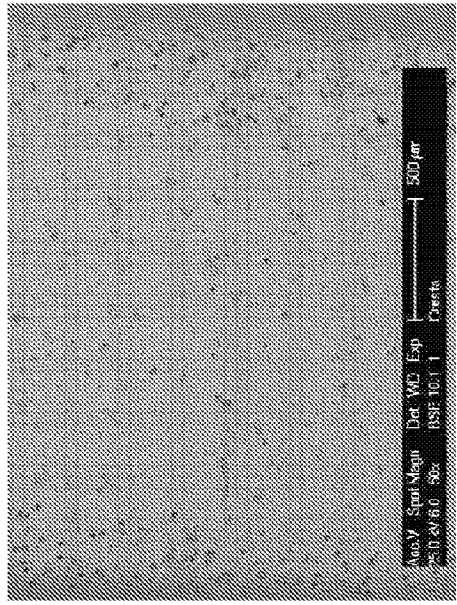

FIG. 13 illustrates the electroplating configuration with an internally threaded cathode 1301 and a metal anode 1302. An internally threaded steel surface was provided as the cathode 1301 in which the copper/microcapsule layer was deposited to. As illustrated in FIG. 14, the threaded connection 1400 used was a 3½" TenarisHydril Blue™ threaded connection. The threaded connection 1400 includes a first threaded surface 1424 and a second threaded surface 1425.

The first threaded surface 1424 includes a crest 1430, a first root 1428, a second root 1432, a loading flank 1429 extending between the first root 1428 and the crest 1430, and a stabbing flank 1431 extending between the crest 1430 and the second root 1432. The radius of curvature 1411 of the intersection of the first root 1428 and the loading flank 1429 was about 0.20 mm. The radius of curvature 1420 of the intersection of the loading flank 1429 and the crest 1430 was about 0.25 mm. The radius of curvature 1413 of the intersection of the crest 1430 and the stabbing flank 1431 was about 0.25 mm. The radius of curvature 1414 of the intersection of the first root 1428 and stabbing flank 1431 was about 0.55 mm. The loading flank 1429 forms an angle 1409 of about 3° from a plane that is perpendicular to the longitudinal axis 1426 of the threaded connection 1400. The stabbing flank 1431 forms an angle 1408 of about 25° from a plane that is perpendicular to the longitudinal axis 1426 of the threaded connection 1400. The distance 1401 between the second root 1432 and the crest 1430 was about 1.25 mm. The distance 1402 from the crest 1430 and a line 1422 parallel the crest 1430 surface was about 0.55 mm.

The second threaded surface 1425 includes a crest 1435, a first root 1433, a second root 1437, a loading flank 1434 extending between the first root 1433 and the crest 1435, and a stabbing flank 1436 extending between the crest 1435 and the second root 1437. The radius of curvature 1421 of the intersection of the first root 1433 and the loading flank 1434 was about 0.20 mm. The radius of curvature 1419 of the intersection of the loading flank 1434 and the crest 1435 was about 0.25 mm. The radius of curvature 1412 of the intersection of the crest 1435 and the stabbing flank 1436 was about 0.60 mm. The radius of curvature 1410 of the intersection of the first root 1433 and stabbing flank 1436 was about 0.20 mm. The loading flank 1434 forms an angle 1418 of about 3° from a plane that is perpendicular to the longitudinal axis 1426 of the threaded connection 1400. The stabbing flank 1436 forms an angle 1416 of about 25° from a plane that is perpendicular to the longitudinal axis 1426 of the threaded connection 1400. The distance 1403 between the second root 1437 and the crest 1435 was about 1.10 mm. The distance 1415 from the first root 1433 and a line 1423 parallel the root 1433, 1437 surfaces was about 0.55 mm. The distances 1404, 1405, 1406, 1407 and 1417 were about 2.48, 2.60, 5.08, 2.54 and 2.54 mm, respectively.

The electroplating process was conducted at room temperature of about 20° C. A plating time of 100 minutes was used to obtain a coating thickness of about 30 microns. To improve adhesion between the copper/microcapsule composite and substrate, the threaded surface was cleaned (e.g. degreased) and electroplated in a Wood nickel type for 4 minutes. Nickel Wood was found to work better than Nickel Watts or other Nickel plating systems for a strike coating to promote adhesion of the copper/microcapsules coating to threaded steel. A rotating phosphorous copper cylinder 1002 was used as the anode for electroplating. The rotation speed was varied between 50 and 200 rpm. Rotation of the anode provided the necessary agitation to the copper bath and also ensured uniformity in microcapsules concentration across the solution.

FIGS. 15A-D are SEM photomicrographs of the microcapsule concentration incorporated in the composite coating for microcapsule concentration in the bath of (a) 1.5 ml·l⁻¹, (b) 3 ml·l⁻¹, (c) 6.5 ml·l⁻¹, and (d) 13 ml·l⁻¹. Unexpectedly, a lower microcapsules concentration produced a more uniform distribution, more capsules were incorporated into the coating, and a better coverage all over the threaded surface was obtained. FIGS. 16A and 16B are SEM photomicrographs of cross-section of the composite coating on the steel threaded connection. Microcapsules were deposited even on difficult sectors of the threads forming a substantially continuous coating with a substantially uniform thickness. As illustrated, the coating is between about 10 µm and 100 µm thick, and as illustrated in FIG. 16A, is measured in one location to have a thickness of 34.7 µm.

Figure 17:
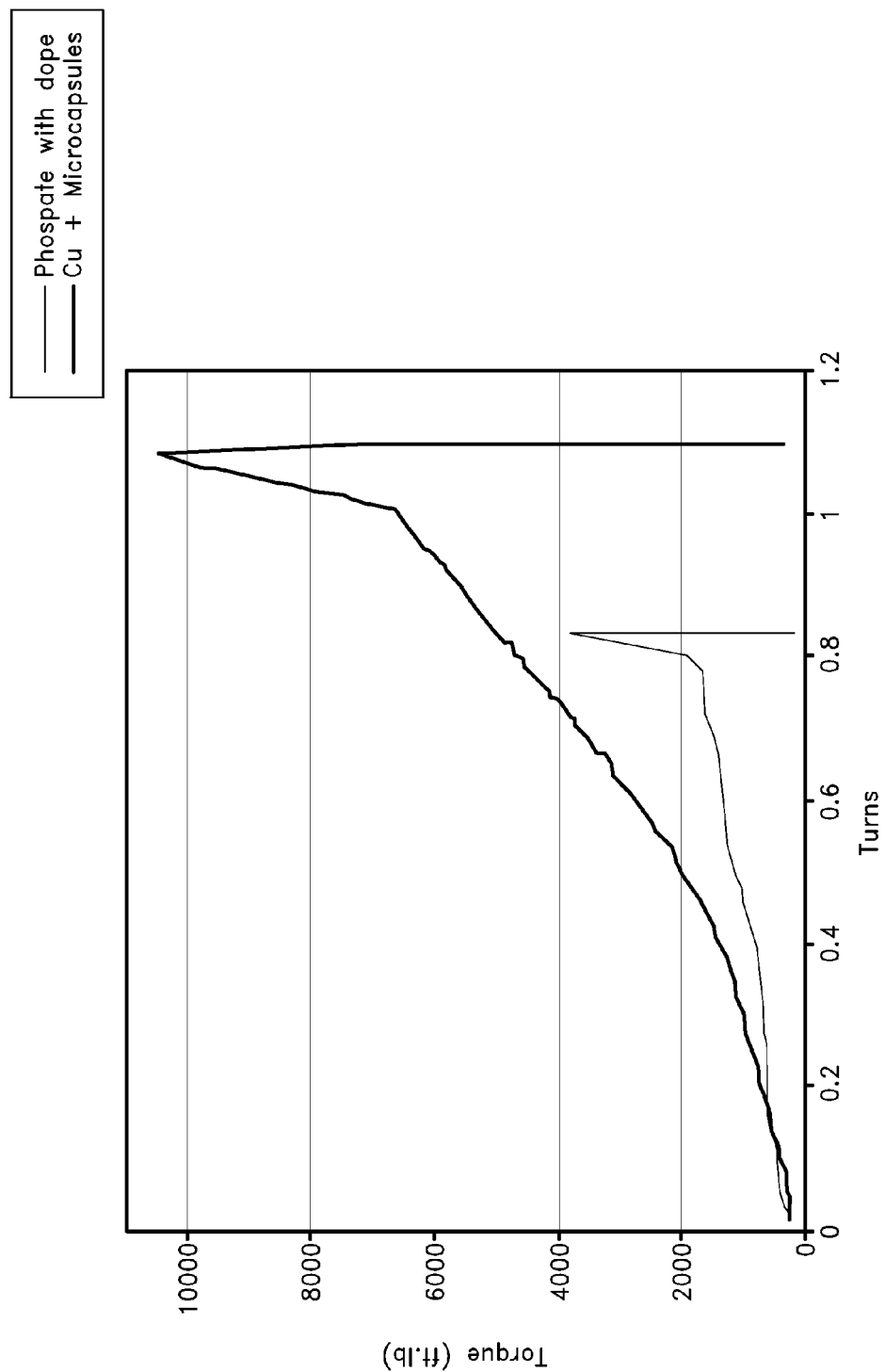
FIG. 17 illustrates make-up torque turns curve of one embodiment of a threaded connection coated with copper/microcapsules and one embodiment of a threaded connection coated with phosphate with dope as a function of turns.

Using the aforementioned coating deposition formulations and set-up it was possible to coat coupling threaded connections and tested them against bare steel threaded pins. FIG. 17 plots make-up torque turns curve of threaded connection coated with copper/microcapsules as a function of turns. The results are comparable with the traditional technology uses in copper plated coupling. Furthermore, additional lubrication can be applied such as dope, grease, etc. To provide a comparison, FIG. 17 also plots a make-up torque turn curve of a threaded connection coated with manganese phosphate over a bare steel couple with dope. The dope was API modified grease. Providing phosphate on a metal can provide lubricity, provide galling resistance and serve as a reservoir for lubricants. Make and break tests showed that the copper microcapsules coating system can resist galling and provide a low friction without any additional lubrication.

Standard phosphate coatings used on threaded connections decompose at elevated temperatures. The copper/microcapsules coating can be stable even at high temperatures and can provide lubrication for threaded connection to be used in high temperature environments. Oil can be chosen to be stable even at these harsh conditions. In particular, oils with higher boiling points can be used.

Figures 18A, 18B:
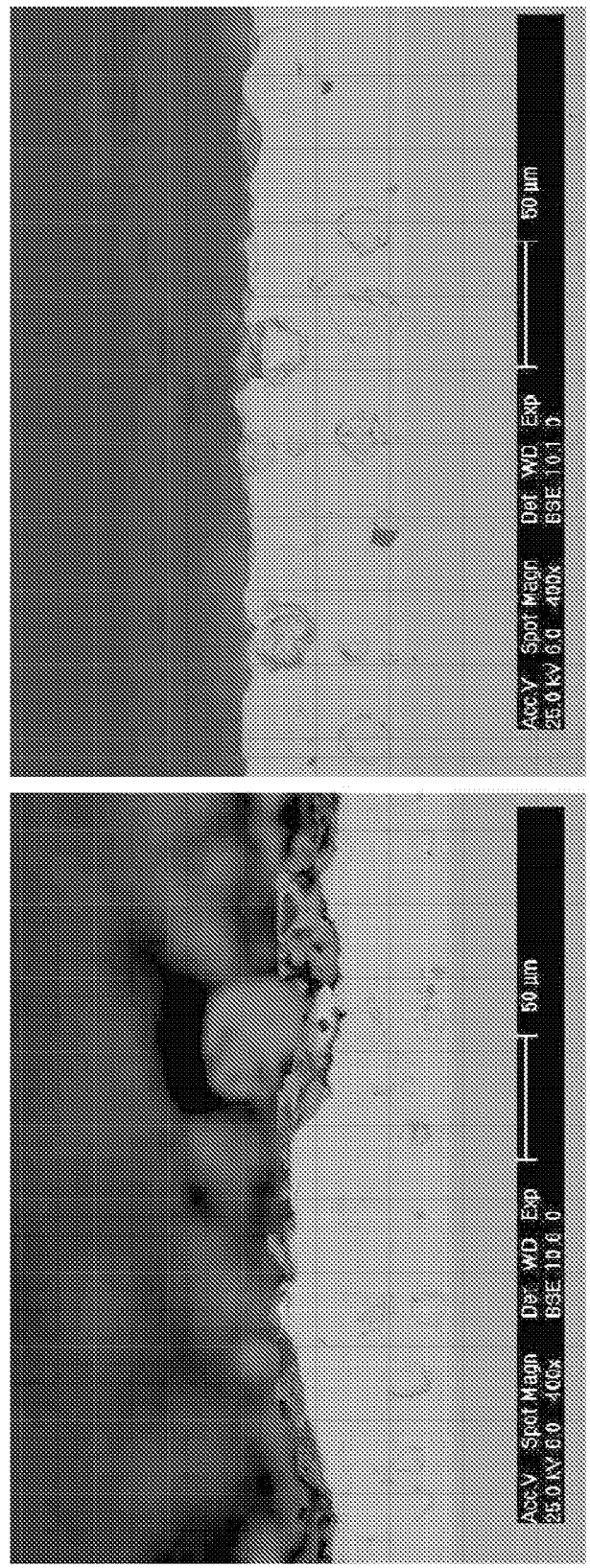
FIGS. 18A and 18B are SEM photomicrographs of the cross-section of a composite copper/microcapsule (A) before heat treatment and (B) after heat treatment.

The composite copper/microcapsule was introduced in a tubular furnace where atmosphere was controlled between 180 and 320° C. for 2 hours. FIGS. 18A and 18B are SEM photomicrographs of the cross-section of the composite copper/microcapsule (A) before the heat treatment and (B) after the heat treatment. The coating exhibited good stability. No deterioration of the capsules was observed, and adhesion to the steel substrate remained intact. The good stability can be attributed that the oil boiling point of about 360° C., which is below that the temperature of the heat treatment.

Figure 19:
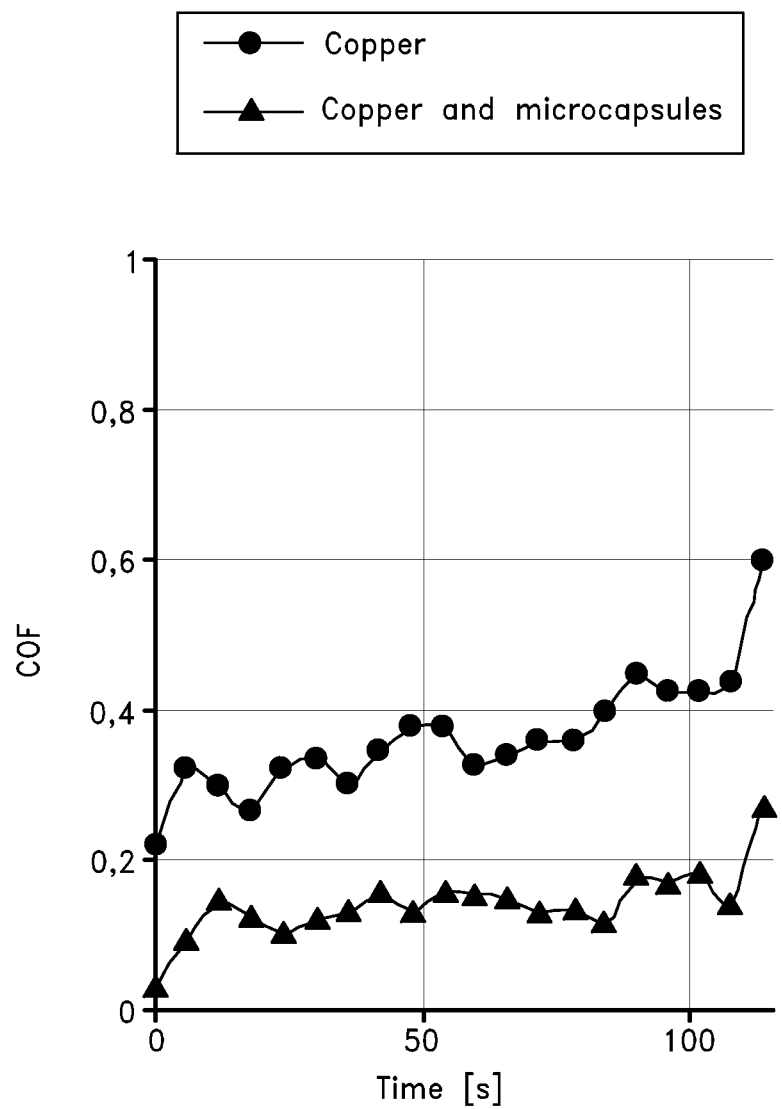
FIG. 19 illustrates coefficient of friction as a function of time (seconds) of a ball-on-cylinder test for embodiments of copper plating with and without oil-containing microcapsules.

Copper and nickel containing microcapsules were deposited on copper cylinder samples. FIG. 19 plots the coefficient of friction (COF) as a function of time (seconds) of a ball-on-cylinder test for copper plating with and without oil-containing microcapsules. The COF for the copper plating with the microcapsules was about 60% less than without microcapsules.

Figure 20:
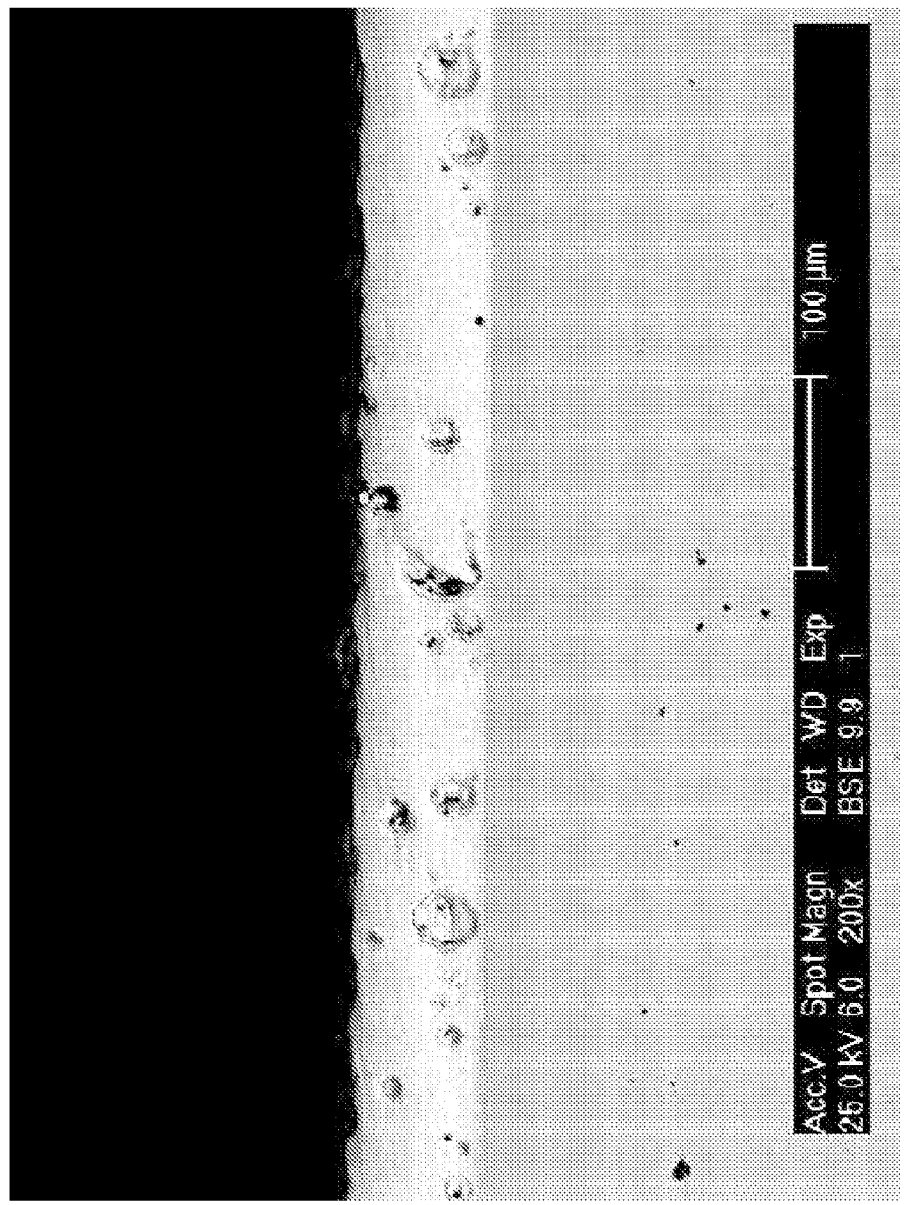
FIG. 20 is a SEM photomicrograph of a cross-section of a Cu-microcapsules composite.
Figure 21:
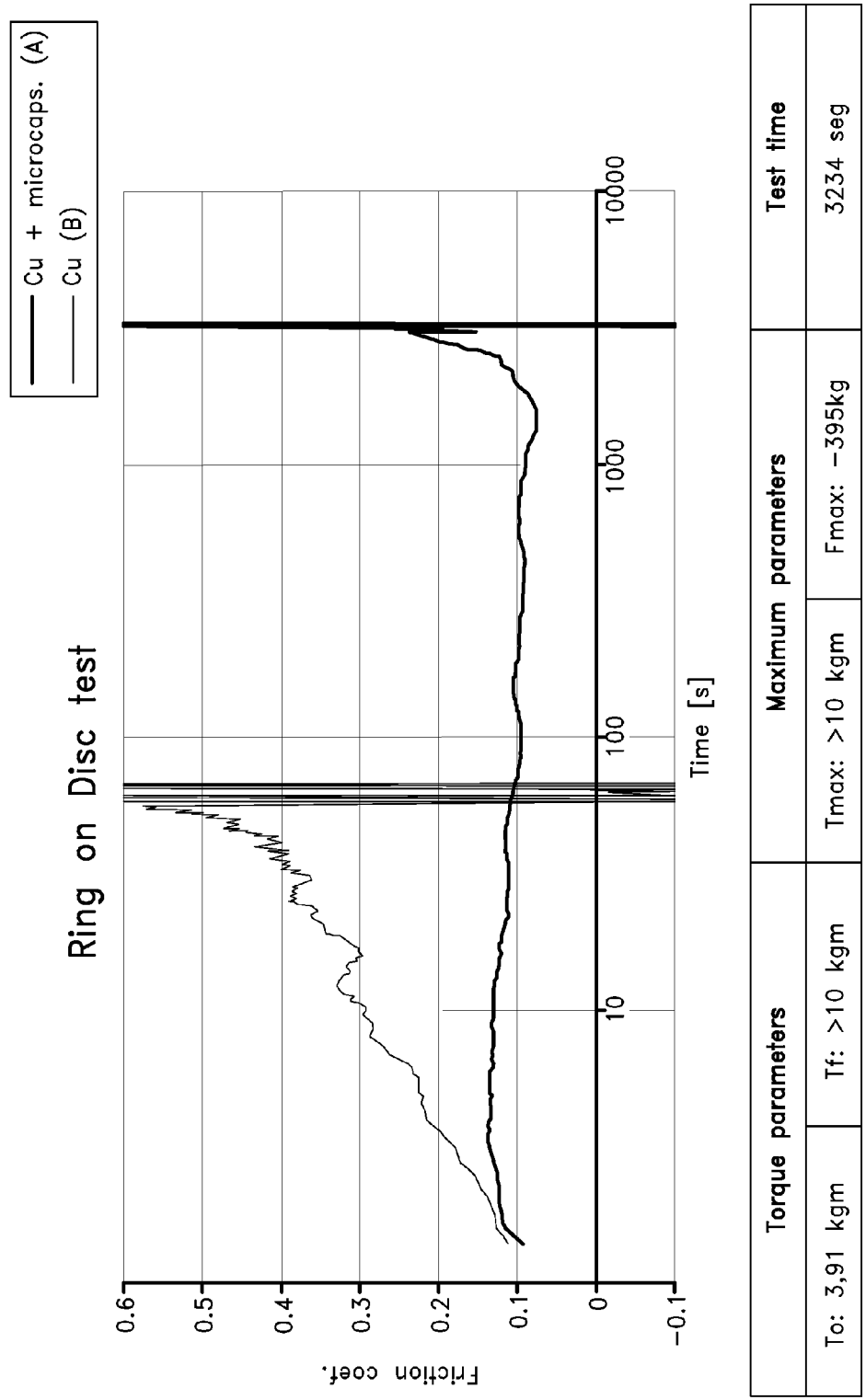
FIG. 21 illustrates ring-on-disc tests for embodiments of: (A) copper with oil-containing microcapsules and (B) copper without oil-containing microcapsules.

Copper containing microcapsules were also deposited on steel disc samples. FIG. 20 is a SEM micrograph of a cross-section of the copper/microcapsule coating with the steel disc substrate. FIG. 21 plots coefficient of friction as a function of time (seconds) for (A) copper with microcapsules and (B) copper without microcapsules for ring-on-disc tests. Much lower friction coefficient (~0.8) and far better wear resistance was obtained with the copper/microcapsules composite.

CONCLUSIONS

In certain embodiments, microcapsules with a liquid core of santosol oil and polyamide as wall material with mean diameter of 13 μm can be produced by interfacial polymerization techniques. In further embodiments, co-deposition of microcapsules with nickel and copper can be achieved through electroplating to produce a metal/microcapsule composite coating. SEM analyses of embodiments of composite coatings show that the microcapsules are effectively incorporated into the coating. In some embodiments, friction coefficient and wear resistant of copper plating is drastically improved by co-deposition of oil containing microcapsules. In certain embodiments, friction was reduced by a factor of two while time until galling was fifty times longer. In some embodiments, "Copper+oil containing microcapsules" composite is a self-lubricating system that does not require additional lubrication.

The various materials, methods and apparatus described above provide a number of ways to carry out some preferred embodiments of the invention. Of course, it is to be understood that not necessarily all objectives or advantages described may be achieved in accordance with any particular embodiment described herein. Thus, for example, those skilled in the art will recognize that the compositions may be made and the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments. Similarly, the various components, features and steps discussed above, as well as other known equivalents for each such component, feature or step, can be mixed and matched by one of ordinary skill in this art to make compounds and perform methods in accordance with principles described herein. For numerical values provided throughout this specification, it will be appreciated that the values may have the exact values or ranges disclosed, or may be approximately or about that of the values or ranges provided.

Although the invention has been disclosed in the context of some embodiments and examples, it will be understood by those skilled in the art that the invention extends beyond these specifically disclosed embodiments to other alternative embodiments and/or uses and obvious modifications and equivalents thereof. Accordingly, the invention is not intended to be limited by the specific disclosures of preferred embodiments herein.

What is claimed is:

1. A method of manufacturing a composite coating comprising:
   providing a mixture comprising microcapsules and electrolyte, wherein the microcapsules comprise a lubricant encapsulated within a shell, and the concentration of the microcapsules in the mixture is greater than zero and less than about 13 milliliters per liter; and
   electroplating a composite coating onto a threaded cathode surface using the mixture and a metal anode, wherein the composite coating comprises metal and at least some of the microcapsules, and wherein all the metal in the coating is a single element metal.

2. The method of claim 1, wherein the concentration of the microcapsules in the mixture is greater than zero and less than about 6.5 milliliters per liter.

3. The method of claim 1, wherein the concentration of the microcapsules in the mixture is greater than zero and less than about 3 milliliters per liter.

4. The method of claim 1, wherein the concentration of the microcapsules in the mixture is greater than zero and less than about 1.5 milliliters per liter.

5. The method of claim 1, wherein the electrolyte comprises $CuSO_4^+$ and $H_2SO_4$.

6. The method of claim 5, wherein the electrolyte further comprises sodium lauryl sulphate.

7. The method of claim 1, wherein a current density of about 15 to 65 $mA/cm^2$ is used for the electroplating.

8. The method of claim 1, further comprising agitating the mixture.

9. The method of claim 8, wherein agitating the mixture includes rotating the anode.

10. The method of claim 1, wherein the cathode comprises steel.

11. The method of claim 1, further comprising plating the cathode surface with a metal prior to electroplating.

12. The method of claim 1, wherein the microcapsules are greater than about 1 μm in diameter.

13. The method of claim 1, wherein the microcapsules are manufactured by a method comprising:
   mixing a first solution having the lubricant and a first monomer that is soluble within the lubricant with a second solution containing water and polyvinyl alcohol to provide an emulsion with the first solution dispersed within the second solution;
   mixing an aqueous solution having a second monomer and an inorganic basic into the emulsion;
   reacting at least some of the first monomer and the second monomer together to provide a polymeric shell around the lubricant.

14. The method of claim 13, wherein the first monomer comprises terephthaloyl dichloride and the second monomer comprises diethylenetriamine.

15. The method of claim 1, wherein the cathode comprises a threaded steel pipe.

16. The method of claim 1, wherein the composite coating forms a continuous uniform coating over all of the electroplated surfaces of a plurality of threads.

17. A method of manufacturing a composite coating comprising:
   providing a mixture comprising microcapsules and electrolyte, wherein the microcapsules comprise a lubricant encapsulated within a shell, and the concentration of the microcapsules in the mixture is greater than zero and less than about 13 milliliters per liter; and
   electroplating a composite coating onto a threaded cathode surface using the mixture and a metal anode, wherein the composite coating comprises metal and at least some of the microcapsules, and wherein all of the metal in the coating is a single element metal and has a coefficient of friction of less than about 0.8;

wherein for at least the portions of the threaded cathode surface where the composite coating is electroplated, the composite coating forms a substantially continuous uniform coating over all of the surfaces of a plurality of threads with a thickness of between about 10 to 100 μM.

18. The method of claim 17, wherein the coefficient of friction of the composite coating is approximately 60% less than an electroplated coating without microcapsules.

19. The method of claim 17, wherein the coefficient of friction of the composite coating is less than about 0.2 for about 100 seconds during a ball-on-cylinder test.

20. The method of claim 17, wherein the coefficient of friction of the composite coating is less than about 0.2 for about 1000 seconds during a ring-on-disc test.

21. The method of claim 17, wherein the coefficient of friction of the composite coating lasts about ten times as long as a coefficient of friction of an electroplated coating without microcapsules during a ring-on-disc test.

22. The method of claim 17, wherein the surfaces of a plurality of threads comprise crests, roots, and flanks.

23. The method of claim 17, wherein the threaded cathode surface is an internally threaded surface.

24. The method of claim 17, wherein the threaded cathode surface is a threaded steel pipe.

25. The method of claim 17, further comprising forming a strike coating between the threaded cathode surface and the composite coating.

26. The method of claim 17, wherein the microcapsules are manufactured by a method comprising:

mixing a first solution having a lubricant and a first monomer that is soluble within the lubricant with a second solution containing water and polyvinyl alcohol to provide an emulsion with the first solution dispersed within the second solution;

mixing an aqueous solution having a second monomer and inorganic basic into the emulsion;

reacting at least some of the first monomer and the second monomer together to provide a polymeric shell around the lubricant.

27. The method of claim 17, wherein the threaded cathode surface comprises an external diameter of between about 2 to 25 inches having between about 2 to 10 threads per inch.

28. The method of claim 17, wherein the composite coating forms a continuous uniform coating over all of the electroplated surfaces of a plurality of threads.

29. The method of claim 1, wherein the single element metal is selected from the group consisting of copper, nickel, tin, and zinc.

30. The method of claim 17, wherein the single element metal is selected from the group consisting of copper, nickel, tin, and zinc.

* * * * *